(12) United States Patent
Kanai et al.

(10) Patent No.: US 12,292,739 B2
(45) Date of Patent: May 6, 2025

(54) AUTONOMOUS TRAVEL SYSTEM

(71) Applicant: Hitachi Construction Machinery Co., Ltd., Tokyo (JP)

(72) Inventors: Masaki Kanai, Tokyo (JP); Tomoyuki Hamada, Tsuchiura (JP); Mikio Bando, Tokyo (JP); Hiroto Morizane, Tokyo (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 304 days.

(21) Appl. No.: 17/909,455

(22) PCT Filed: Mar. 19, 2021

(86) PCT No.: PCT/JP2021/011329
§ 371 (c)(1),
(2) Date: Sep. 6, 2022

(87) PCT Pub. No.: WO2021/193412
PCT Pub. Date: Sep. 30, 2021

(65) Prior Publication Data
US 2023/0121070 A1   Apr. 20, 2023

(30) Foreign Application Priority Data

Mar. 26, 2020   (JP) .................. 2020-055527

(51) Int. Cl.
*G05D 1/00* (2024.01)
*G05D 1/24* (2024.01)
(Continued)

(52) U.S. Cl.
CPC ......... *G05D 1/0214* (2013.01); *G05D 1/0274* (2013.01); *G05D 1/0289* (2013.01);
(Continued)

(58) Field of Classification Search
CPC .. G05D 1/0214; G05D 1/0274; G05D 1/0289; G05D 1/24; G05D 1/617;
(Continued)

(56) References Cited

U.S. PATENT DOCUMENTS

2001/0021888 A1* 9/2001 Burns .................. G05D 1/0278
701/26
2002/0143461 A1* 10/2002 Burns .................. G05D 1/0297
701/23

(Continued)

FOREIGN PATENT DOCUMENTS

| JP | 2005-242460 A | 9/2005 |
| JP | 5994656 B2 | 9/2016 |
| JP | 6159031 B2 | 7/2017 |
| WO | WO 2018/026603 A1 | 2/2018 |
| WO | WO 2019/142322 A1 | 7/2019 |

OTHER PUBLICATIONS

X. Zhang, M. Geimer, L. Grandl and B. Kammerbauer, "Method for an electronic controlled platooning system of agricultural vehicles," 2009 IEEE International Conference on Vehicular Electronics and Safety (ICVES), Pune, India, 2009, pp. 156-161, doi:10.1109/ICVES. 2009.5400187. (Year: 2009).*

(Continued)

*Primary Examiner* — Anne Marie Antonucci
*Assistant Examiner* — Jordan T Smith
(74) *Attorney, Agent, or Firm* — Crowell & Moring LLP

(57) ABSTRACT

Provided is an autonomous travel system capable of effectively suppressing generation of ruts. It is a further object to provide an autonomous travel system including unmanned vehicles that travel on a transportation path constituted of opposite lanes, which is capable of suppressing generation of ruts while preventing proximity to an on-corning vehicle. An in-vehicle control device 200 includes: an offset amount determination unit 202 adapted to, based on common offset information received via a wireless communication device (Continued)

240, determine an offset amount of a travel path 60 based on map information 251 and generate a target track 62; and an autonomous travel control unit 201 adapted to output a travel instruction to control traveling of a body so as to track the target track 62 to which the offset amount has been added based on the target track 62 and an own-vehicle position.

15 Claims, 20 Drawing Sheets

(51) Int. Cl.
G05D 1/617 (2024.01)
G05D 1/693 (2024.01)
H04W 4/40 (2018.01)

(52) U.S. Cl.
CPC ............... *G05D 1/24* (2024.01); *G05D 1/617* (2024.01); *G05D 1/693* (2024.01); *H04W 4/40* (2018.02)

(58) Field of Classification Search
CPC .... G05D 1/693; G05D 1/0212; G05D 1/0297; H04W 4/40
See application file for complete search history.

(56) References Cited

U.S. PATENT DOCUMENTS

| | | | |
|---|---|---|---|
| 2002/0165649 A1* | 11/2002 | Wilhelm Rekow | G05D 1/0295 701/466 |
| 2013/0030606 A1* | 1/2013 | Mudalige | G05D 1/0295 701/2 |
| 2017/0017235 A1* | 1/2017 | Tanaka | G05D 1/0223 |
| 2017/0017239 A1* | 1/2017 | Kanai | G05D 1/0055 |
| 2017/0315561 A1 | 11/2017 | Kadono et al. | |
| 2017/0371336 A1* | 12/2017 | Mei | B60W 30/095 |
| 2020/0319641 A1 | 10/2020 | Tsuda | |

OTHER PUBLICATIONS

International Search Report (PCT/ISA/210) issued in PCT Application No. PCT/JP2021/011329 dated Jun. 1, 2021 with English translation (four (4) pages).
Japanese-language Written Opinion (PCT/ISA/237) issued in PCT Application No. PCT/JP2021/011329 dated Jun. 1, 2021 (four (4) pages).
Extended European Search Report issued in European Application No. 21774653.6 dated Mar. 15, 2024 (9 pages).

* cited by examiner

Fig. 3

| Node ID | Coordinates | Target speed | Offset factor |
|---|---|---|---|
| 1 | $(X_1, Y_1)$ | $V_1$ | $\alpha_1$ |
| 2 | $(X_2, Y_2)$ | $V_2$ | $\alpha_2$ |
| 3 | $(X_3, Y_3)$ | $V_3$ | $\alpha_3$ |
| 4 | $(X_4, Y_4)$ | $V_4$ | $\alpha_4$ |
| 5 | $(X_5, Y_5)$ | $V_5$ | $\alpha_5$ |
| ... | ... | ... | ... |

Fig. 14

| Node ID | Coordinates | Target speed | Empty-load offset factor | Load offset factor |
|---|---|---|---|---|
| 1 | $(X_1, Y_1)$ | $V_1$ | $\alpha_{1\_1}$ | $\alpha_{1\_2}$ |
| 2 | $(X_2, Y_2)$ | $V_2$ | $\alpha_{2\_1}$ | $\alpha_{2\_2}$ |
| 3 | $(X_3, Y_3)$ | $V_3$ | $\alpha_{3\_1}$ | $\alpha_{3\_2}$ |
| 4 | $(X_4, Y_4)$ | $V_4$ | $\alpha_{4\_1}$ | $\alpha_{4\_2}$ |
| 5 | $(X_5, Y_5)$ | $V_5$ | $\alpha_{5\_1}$ | $\alpha_{5\_2}$ |
| ... | ... | ... | ... | ... |

Fig. 19

| Vehicle ID | Target path |
|---|---|
| vehicle_1 | node_DP0~node_LP0 |
| vehicle_2 | node_DP0~node_LP0 |
| ... | ... |
| ... | ... |
| ... | ... |
| vehicle_m | node_LP0~node_DP0 |
| vehicle_m+1 | node_LP0~node_DP0 |

AUTONOMOUS TRAVEL SYSTEM

TECHNICAL FIELD

The present invention relates to an autonomous travel system, and more particularly to an autonomous travel system in a worksite in which autonomous unmanned vehicles travel in opposite directions on a transportation path.

BACKGROUND ART

Dump trucks, which transport earth and sand and ores while traveling on a transportation path, operate in a strip mine or the like. Since such dump trucks generally have a large weight and many transportation paths are unpaved, ruts tend to be generated on the travel trajectories of the dump trucks. The presence of a rut has a negative influence, such as increase in road surface resistance, reduction of body stability, or the like, and thus a maintenance vehicle, such as a grader, usually performs ground leveling for the maintenance of the transportation path. Unfortunately, such ground leveling work on the transportation path disturbs traveling of the dump trucks, resulting in a low transportation efficiency. For this reason, it is desirable that generation of ruts be suppressed as much as possible when the dump trucks travel. In addition, in a known autonomous travel system for performing transporting work using dump trucks that travel autonomously (hereinafter referred to as "unmanned vehicles") without an operator on board, deeper ruts tend to be generated when a plurality of unmanned vehicles travels on the same track. Thus, it is more important to solve the foregoing problem.

As conventional techniques, for example Patent Literature 1 below or the like describes a method that generates in advance a plurality of target travel paths, along which an unmanned vehicle travels toward loading work points of an excavator in a loading place of a mine, and selects a travel path from the plurality of target travel paths. Meanwhile, for example Patent Literature 2 below or the like describes a method that controls, upon detecting a rut, a passage position of a vehicle traveling automatically on a predetermined travel path such that its wheels pass on a step of the rut.

CITATION LIST

Patent Literature

Patent Literature 1: JP 6159031 B
Patent Literature 2: JP 5994656 B

SUMMARY OF INVENTION

Technical Problem

In the method described in the above Patent Literature 1, generation of ruts is suppressed by displacing a travel track of an individual vehicle for dispersion. Meanwhile, in the method described in the above Patent Literature 2, the influence of a generated rut is reduced by detecting a rut and displacing a travel track of a vehicle when traveling so as to flatten a step of the rut. Both of these techniques are used for suppressing the generation of ruts when one vehicle operates. However, as described in the above Patent Literature 1, 2, giving a travel instruction individually to the plurality of vehicles operating in a worksite, such as a mine, may increase a computation load and make a computation process more complicated, for example. In addition, on a transportation path, when unmanned vehicles traveling in opposite lanes displace their respective tracks toward the opposite lane, the vehicles may come close to each other when passing by the on-coming vehicle, thus increasing a collision risk. For this reason, on the transportation path, it is necessary for a vehicle to displace its track with a proper distance from a vehicle in the opposite lane.

The present invention has been made in view of the foregoing and provides an autonomous travel system capable of effectively suppressing generation of ruts. It is a further object of the present invention to provide an autonomous travel system including unmanned vehicles that travel on a transportation path constituted of opposite lanes, which is capable of suppressing generation of ruts while preventing proximity to an on-coming vehicle.

Solution to Problem

In view of the foregoing, an autonomous travel system according to the present invention is an autonomous travel system including a plurality of vehicles, each including: a travel drive device adapted to drive a body; a position sensor for acquiring an own-vehicle position; a storage device storing map information; an in-vehicle control device adapted to, based on the own-vehicle position and the map information, output to the travel drive device a travel instruction to control traveling of the body so as to track a travel path based on the map information; and a wireless communication device that can communicate information with an outside. Based on common offset information received via the wireless communication device, the in-vehicle control device determines an offset amount of the travel path based on the map information, generates a target track, and outputs a travel instruction to control traveling of the body so as to track the target track to which the offset amount has been added based on the target track and the own-vehicle position.

Advantageous Effects of Invention

According to the present invention, since a plurality of vehicles operating in a worksite displaces target tracks based on common offset information, it is possible to effectively suppress generation of ruts. In addition, since the target tracks are displaced based on the common offset information when a plurality of unmanned vehicles travels on a transportation path including opposite lanes, it is possible to disperse travel tracks and suppress generation of ruts while maintaining a safe distance between the vehicles when passing each other.

It should be noted that other problems, configurations, and advantageous effects will become apparent from the following description of embodiments.

BRIEF DESCRIPTION OF DRAWINGS

FIG. 3 illustrates an example of a map information table according to the first embodiment.

FIG. 4A illustrates a single node and FIG. 4B illustrates whole travel paths.

FIG. 11A illustrates a time when a certain unmanned vehicle performs dumping. FIG. 11B illustrates a time when a following unmanned vehicle is at a switch-back point. FIG. 11C illustrates a time when the following unmanned vehicle performs dumping.

FIG. 14 illustrates an example of a map information table according to a second embodiment.

FIG. 19 illustrates an example of a dispatch information table according to the third embodiment.

DESCRIPTION OF EMBODIMENTS

Figure 1:
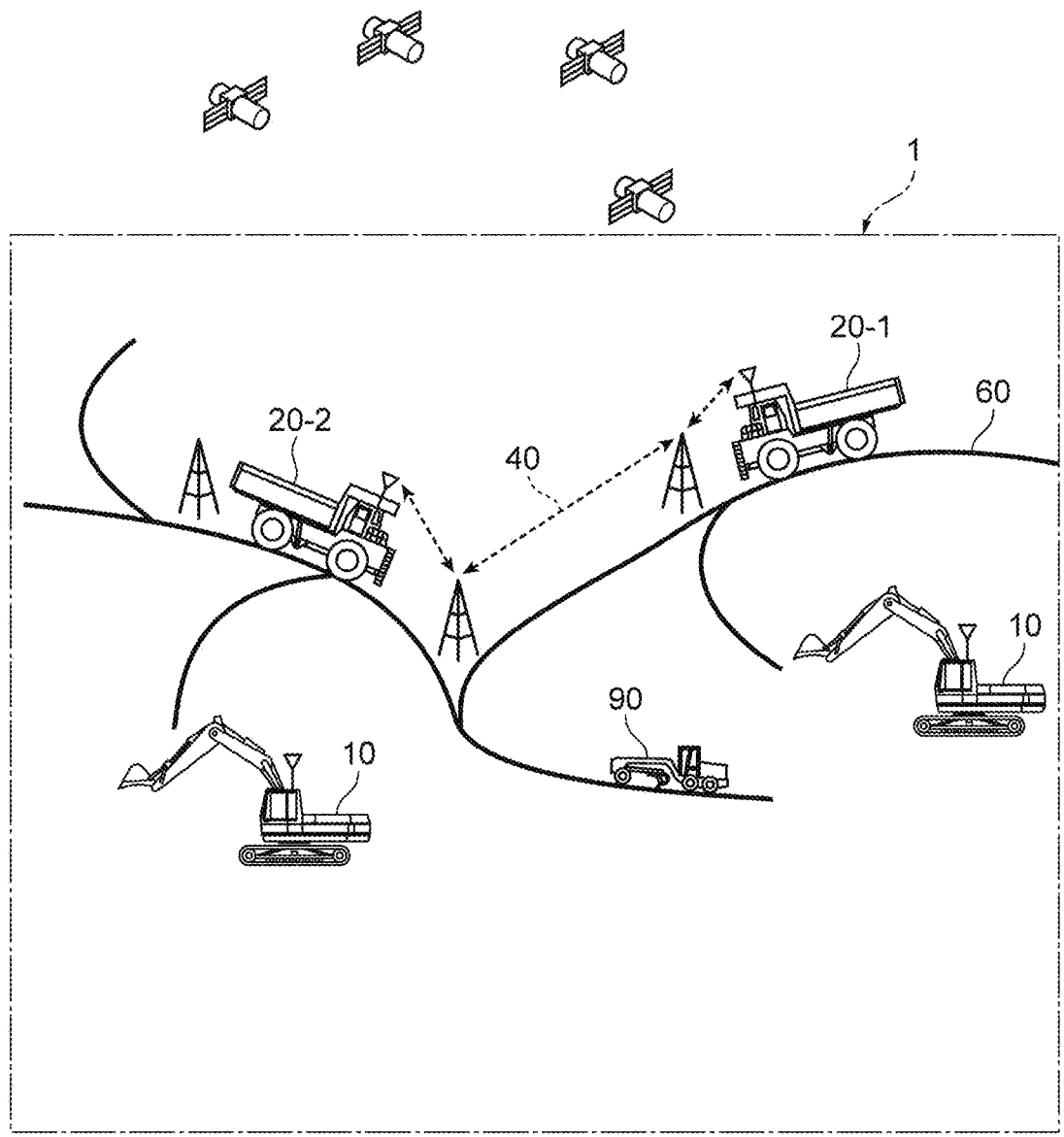
FIG. 1 is a diagram illustrating a schematic configuration of an autonomous travel system according to a first embodiment.

Hereinafter, embodiments of the present invention will be described with reference to the drawings. Parts having the same function are denoted by the same or associated reference numerals throughout the drawings for illustrating the embodiments, and repeated description thereof will be omitted. Further, in the following embodiments, description of the same or similar part will not be repeated in principle unless otherwise particularly needed.

First Embodiment

FIG. 1 is a diagram illustrating a schematic configuration of an autonomous travel system 1 according to a first embodiment. The autonomous travel system 1 illustrated in FIG. 1 includes at least one unmanned vehicle (e.g., dump truck) 20 for transporting loads, such as earth and sand and ores loaded from an excavator 10 that performs digging and loading work in a worksite, such as a strip mine, and a wireless network 40 that allows the unmanned vehicles 20 to be communicably connected to each other. In the worksite in which the unmanned vehicle 20 travels, there is also a manned vehicle (e.g., a grader) 90 used for maintenance of a transportation path or the like. It should be noted that in FIG. 1, each unmanned vehicle 20 that can autonomously travel is denoted by 20-1, 20-2, and the like. In the autonomous travel system 1 of the present embodiment, each unmanned vehicle 20 refers to map information constituted of nodes (not illustrated), each defined beforehand by coordinates, representing a travel path 60, and travels such that the coordinates of the own-vehicle position approach the coordinates of the nodes, so as to autonomously travel while tracking the travel path 60.

Figure 2:
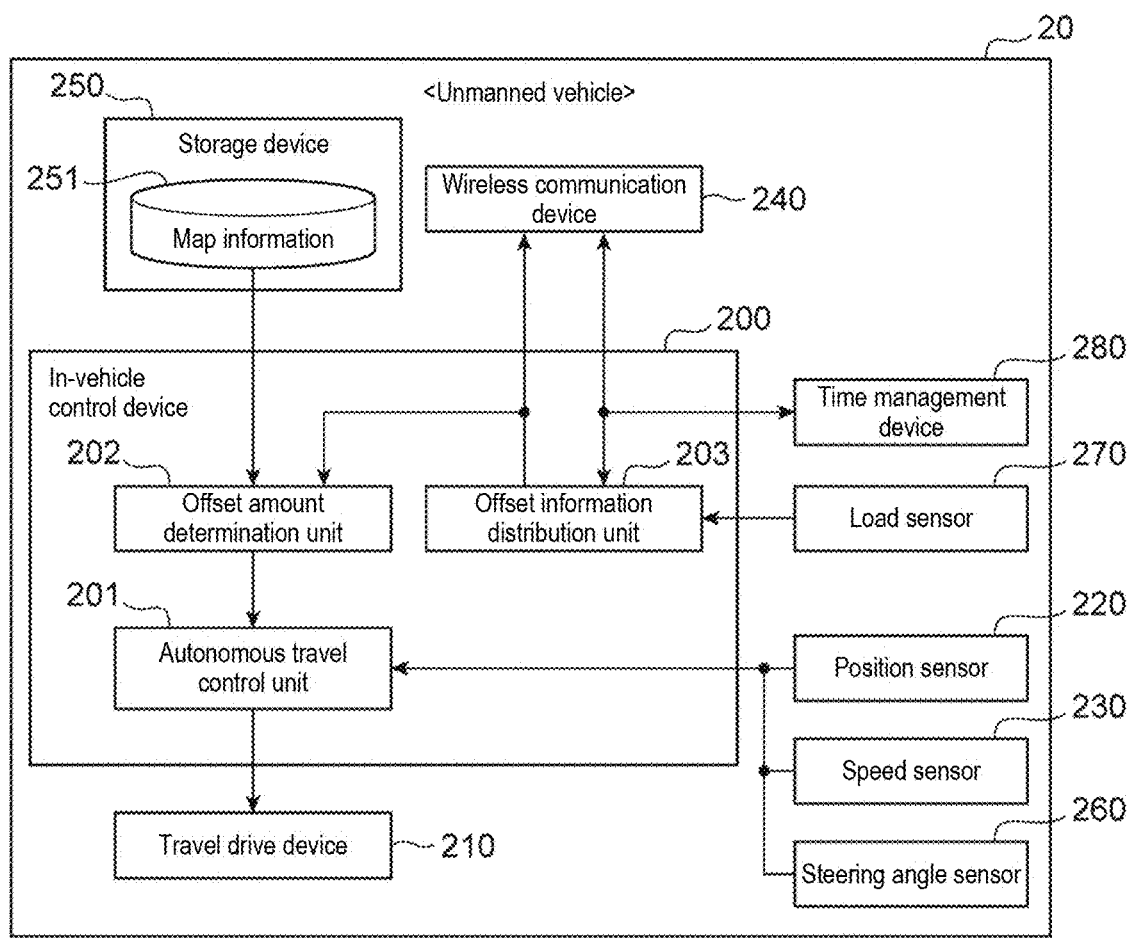
FIG. 2 is a block diagram of the autonomous travel system according to the first embodiment.

FIG. 2 is a block diagram of the unmanned vehicle 20 in the autonomous travel system 1 according to the first embodiment. The autonomous travel system 1 includes a plurality of unmanned vehicles 20 having the identical configuration.

The unmanned vehicle 20 includes, as hardware configurations, an in-vehicle control device 200, a storage device 250, a wireless communication device 240, a travel drive device 210, a position sensor 220, a speed sensor 230, a steering angle sensor 260, a load sensor 270, and a time management device 280.

The travel drive device 210 is for allowing (driving) the unmanned vehicle 20 (or the body thereof) to autonomously travel, and includes a travel motor for allowing the unmanned vehicle 20 to travel, a brake, and a steering motor for changing a steering angle of the unmanned vehicle 20.

The position sensor 220 is for acquiring a position (i.e., own position) of the unmanned vehicle 20 and may be, for example, a global positioning system (GPS) or the like. Alternatively, the position sensor 220 may be a combination of a GPS apparatus and an inertial measurement unit (IMU) for calculating a position, or a system for specifying a position using radio waves from a base station installed on the ground.

The speed sensor 230 is for acquiring a speed of the unmanned vehicle 20 and may be, for example, a GPS apparatus or a wheel speed sensor.

The steering angle sensor 260 is for acquiring a steering angle of the unmanned vehicle 20 and may be, for example, an encoder or the like attached to a steering mechanism of the body.

The load sensor 270 is for acquiring a load condition of the unmanned vehicle 20 and may be, for example, a sensor for measuring a weight, or the like. Alternatively, the load sensor 270 may be a system including a sensor for measuring a suspension pressure of the body to estimate a load weight based on the measured pressure.

The time management device 280 is for synchronizing timings of updating offset information (described later), and is adapted to hold a time of the own vehicle received from an offset information distribution unit 203 when the offset information distribution unit 203 detects a change in the state of the body, such as when each unmanned vehicle 20 performs dumping or the like, and then notify the time to another vehicle via the wireless communication device 240. In addition, when receiving a time from another vehicle via the wireless communication device 240, the time management device 280 matches the time of the own vehicle held in the time management device 280 to the received time.

The in-vehicle control device 200 includes a CPU (central processing unit), RAM (random access memory), and ROM (read only memory), which individually perform calculation of a program, perform reading and writing information from and to a work area, and temporarily store the program, to control the operation of the unmanned vehicle 20. In the autonomous travel system 1 of the present embodiment, the in-vehicle control device 200 outputs to the travel drive device 210 a travel instruction to control traveling of the body so that the unmanned vehicle 20 autonomously travels while tracking the travel path 60.

The storage device 250 is an information readable/writable non-volatile storage medium, and stores an operating system (OS), various control programs, application programs, databases, and the like. In the autonomous travel system 1 of the present embodiment, the storage device 250 stores map information 251 representing the travel path 60.

The wireless communication device 240 is radio equipment for connection to the wireless network 40, capable of communicating information with the outside.

The in-vehicle control device 200 of the unmanned vehicle 20 includes, as functional blocks, an autonomous travel control unit 201, an offset amount determination unit 202, and an offset information distribution unit 203. The storage device 250 includes the map information 251.

FIG. 3 illustrates an example of data stored as the map information 251. The map information 251 is information on a series of nodes representing the travel path 60 of the own vehicle. In the map information 251, each node is given a node ID, coordinates indicating a position in a mine, a target speed of the unmanned vehicle 20, and an offset factor for determining an offset amount of each node (described later). The map information 251 is provided in advance with information corresponding to sections required for the unmanned vehicle 20 to travel, and for example, an external control station or the like may set, for each unmanned vehicle 20, nodes of exclusive travel sections that prevent the unmanned vehicle 20 from interfering with another unmanned vehicle 20, and the nodes received via the wireless communication device 240 may be stored as needed. Alternatively, the map information 251 may hold in advance all of the series of nodes of a path along which the unmanned vehicle 20 should travel. In this case, in order to avoid interference with another vehicle, the unmanned vehicle 20 may periodically receive the position of the other vehicle via the wireless communication device 240 and control traveling to decelerate or stop as needed.

The offset amount determination unit 202 is adapted to determine an offset amount with respect to each node of the travel path 60 based on the offset information distributed by the own vehicle or the other vehicle and received via the wireless communication device 240 and the map information 251 representing the travel path 60 of the unmanned vehicle 20, and add the determined offset amount to the coordinates of the node, so as to generate a sequence of coordinate points serving as a target track when the unmanned vehicle 20 travels, and then send a target track and a target speed to the autonomous travel control unit 201.

The autonomous travel control unit 201 is adapted to generate a steering instruction value so that the own-vehicle position approaches the target track, based on the target track sent by the offset amount determination unit 202, the own-vehicle position acquired from the position sensor 220, and the steering angle acquired from the steering angle sensor 260. In addition, the autonomous travel control unit 201 is adapted to generate an acceleration/deceleration instruction value so that the own-vehicle speed approaches the target speed, based on the target speed on the target track and the own-vehicle speed acquired from the speed sensor 230. The autonomous travel control unit 201 sends the steering instruction value and the acceleration/deceleration instruction value (collectively referred to as a travel instruction) generated in the above processes to the steering motor, the brake, and the travel motor of the travel drive device 210, thereby controlling tracking to the target track.

The offset information distribution unit 203 is adapted to determine offset information used when the offset amount determination unit 202 of the unmanned vehicle 20 determines an offset amount of each node in response to a change in the state of the body (e.g., a change in the body weight), as a trigger, such as when each unmanned vehicle 20 performs dumping or the like, and distribute the determined offset information to all of the unmanned vehicles 20 via the wireless communication device 240. In the following description of the present embodiment, the offset information will be described as an angle for determining a direction of an offset amount (vector amount), but is not limited thereto. The offset information may be a parameter for determining the angle, or the offset amount itself. Alternatively, the offset information may be a message acting as a trigger for updating the offset amount in each unmanned vehicle 20.

Figure 4A:
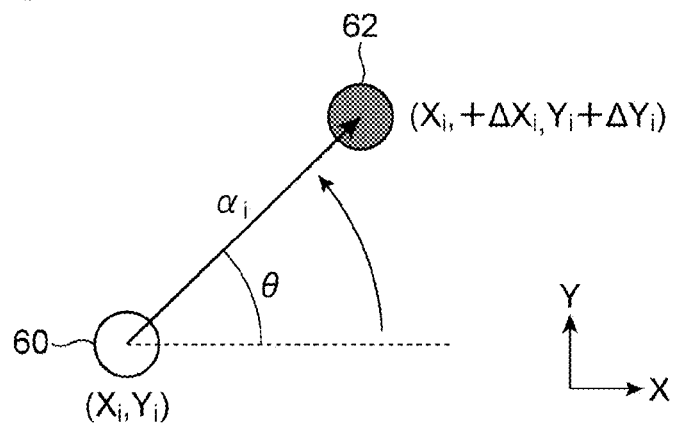
FIGS. 4A and 4B illustrate a method for generating a target track by an offset amount determination unit.
Figure 4B:
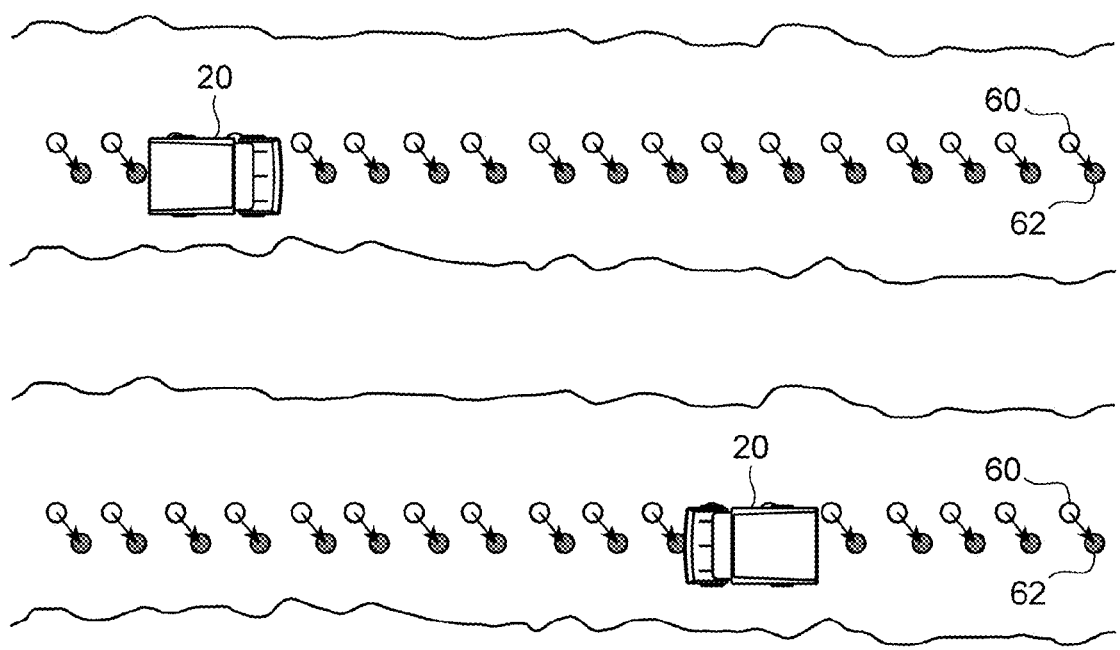

With reference to FIGS. 4(*a*) and (*b*), FIG. 5, FIG. 6, FIG. 9, and FIG. 10, the following describes the operation of the offset amount determination unit 202 to determine an offset amount and generate a target track and the operation of the autonomous travel control unit 201 to control the unmanned vehicle 20 to travel while tracking the target track.

FIGS. 4(*a*) and (*b*) illustrate a method for generating a target track obtained by offsetting a travel path by the offset amount determination unit 202. FIG. 4(*a*) illustrates a single node and FIG. 4(*b*) illustrates a situation of offsetting each of the whole travel paths. In the present embodiment, the offset information distributed by the offset information distribution unit 203 of the own vehicle or the other vehicle is assumed to be an angle θ illustrated in FIG. 4(*a*). Herein, θ is a counterclockwise rotating angle with the X axis as an origin. An open circle 60 indicates the coordinates $(X_i, Y_i)$ of a given node (node ID: i) on the travel path in the map information 251 and a filled circle 62 indicates the coordinates $(X_i+\Delta X_i, Y_i+\Delta Y_i)$ of a target track obtained by adding an offset amount $(\Delta X_i, \Delta Y_i)$ to the coordinates $(X_i, Y_i)$. Using the angle θ that is the offset information and an offset factor $\alpha_i$ described (held) in the map information 251, the offset amount $(\Delta X_i, \Delta Y_i)$ regarding the node i is calculated by the following equations:

[Equation 1]

$$\Delta X_i = \alpha_i \times \cos\theta \qquad \text{(Equation 1)}$$

[Equation 2]

$$\Delta Y_i = \alpha_i \times \sin\theta \qquad \text{(Equation 2)}$$

Through the above calculation, as illustrated in FIG. 4(*b*), each node of the travel path 60 of each unmanned vehicle 20 is offset in the direction of the common angle θ by a magnitude of the offset factor $\alpha_i$ for each node, and then a target track 62 of the unmanned vehicle 20 can be obtained.

Figure 5:
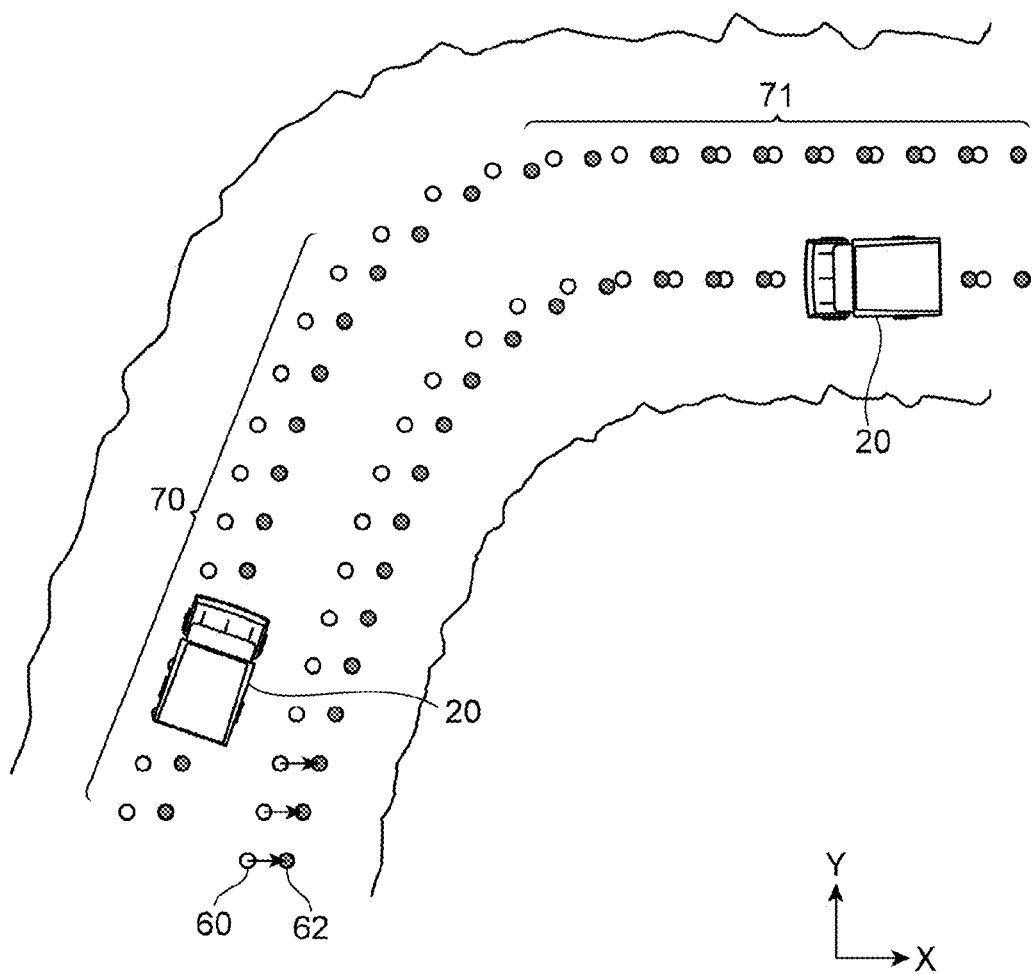
FIG. 5 illustrates an example of generating a target track (when offset in an X-axis direction) on a curve by the offset amount determination unit.
Figure 6:
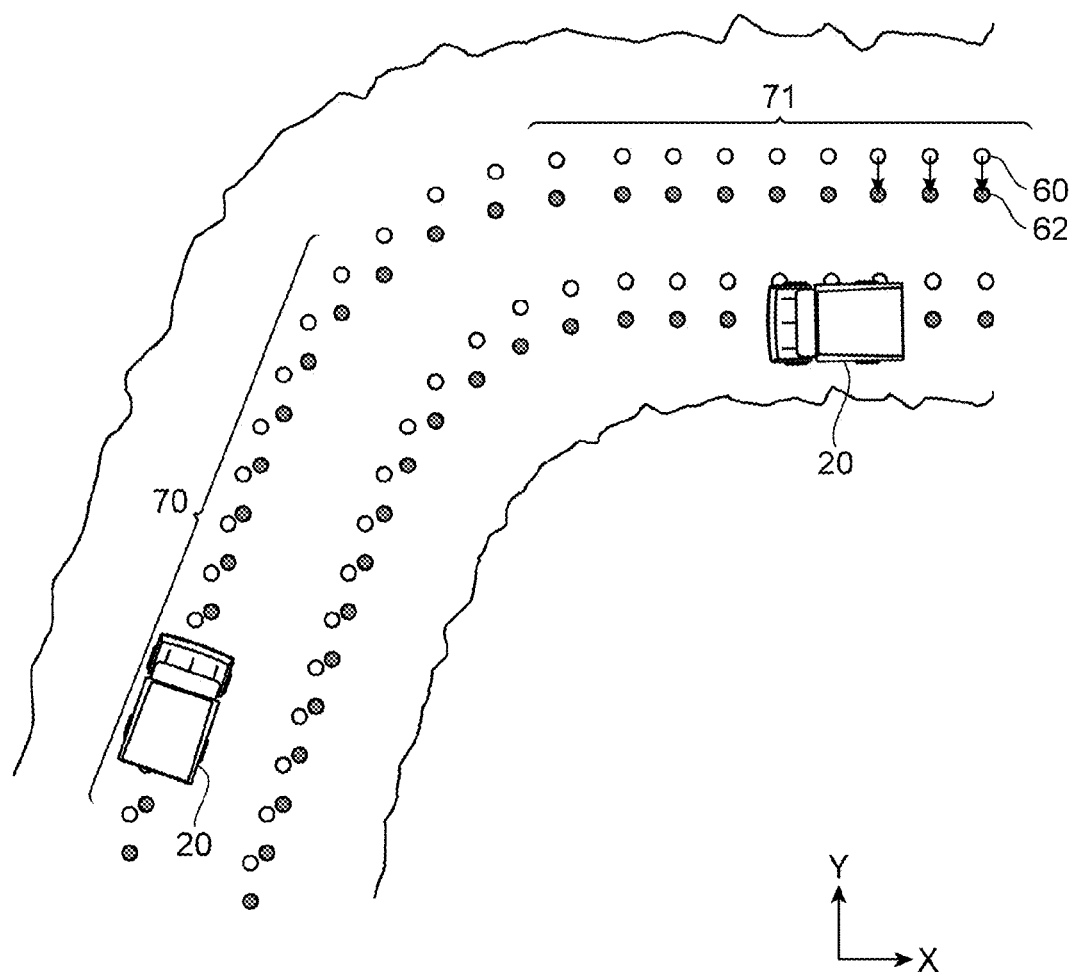
FIG. 6 illustrates an example of generating a target track (when offset in a Y-axis direction) on a curve by the offset amount determination unit.

FIG. 5 and FIG. 6 each illustrate an example of generating a target track on a curve by the offset amount determination unit 202. FIG. 5 illustrates an example when the target track is offset in the X-axis direction (θ=0 deg) and FIG. 6 illustrates an example when the target track is offset in the Y-axis direction (θ=270 deg). Depending on the relation between the advancing direction on the original travel path 60 and the angle θ, the target track 62 may overlap with the original travel path 60. For example, in a situation illustrated in FIG. 5, since the advancing direction on the travel path 60 in a section 71 is parallel to the X axis and also the direction of the offset amount of each node is along the X-axis direction, the target track 62 that is offset with respect to the travel path 60 overlaps with the travel path 60. Meanwhile, in a section 70, the target track 62 is generated in a position displaced in the width direction with respect to the travel path 60. In another situation illustrated in FIG. 6, in the section 71, the target track 62 is generated in a position displaced in the width direction with respect to the travel path 60, and in the section 70, the target track 62 is generated in a position substantially overlapping with the travel path 60. As described above, even if the target track 62 temporarily appears not to be offset with respect to the original travel path 60, a change in the angle θ may allow the target track 62 to be generated in a position certainly displaced, at a different time, in the width direction with respect to the travel path 60.

Figure 9:
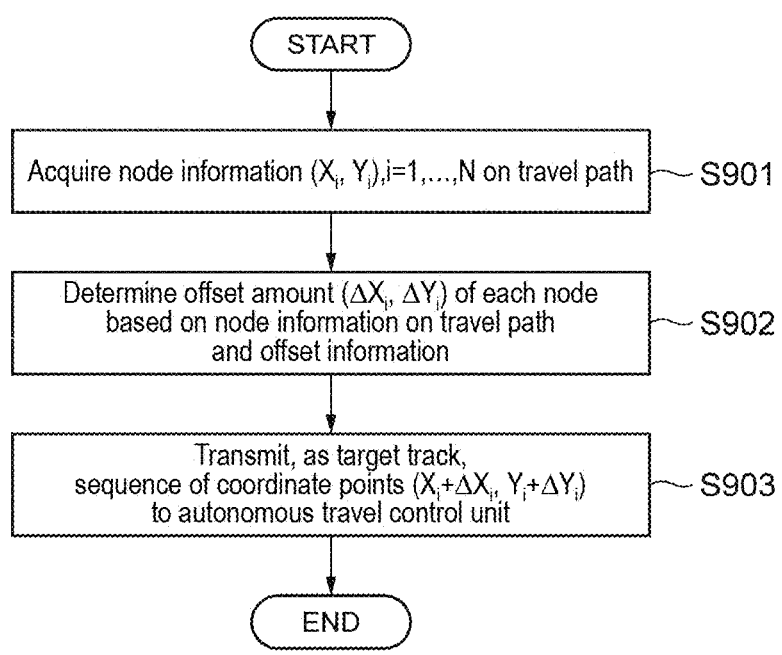
FIG. 9 is a flowchart of a process procedure of the offset amount determination unit according to the first embodiment.

FIG. 9 is a flowchart of a process procedure of the offset amount determination unit 202. The offset amount determination unit 202 first acquires node information (coordinates: $(X_i, Y_i)$, i=1, . . . , N) on the travel path 60 from the map information 251 in the storage device 250 (S901). Next, the offset amount determination unit 202 determines an offset amount $(\Delta X_i, \Delta Y_i)$ of each node using the acquired node information on the travel path 60 and the latest (common) offset information distributed by the offset information distribution unit 203 of the own vehicle or the other vehicle (S902). Then, the offset amount determination unit 202 transmits, as the target track 62, a sequence of coordinate points $(X_i+\Delta X_i, Y_i+\Delta Y_i)$ obtained by adding the offset amount to the coordinates of the original nodes to the autonomous travel control unit 201 (S903).

Figure 10:
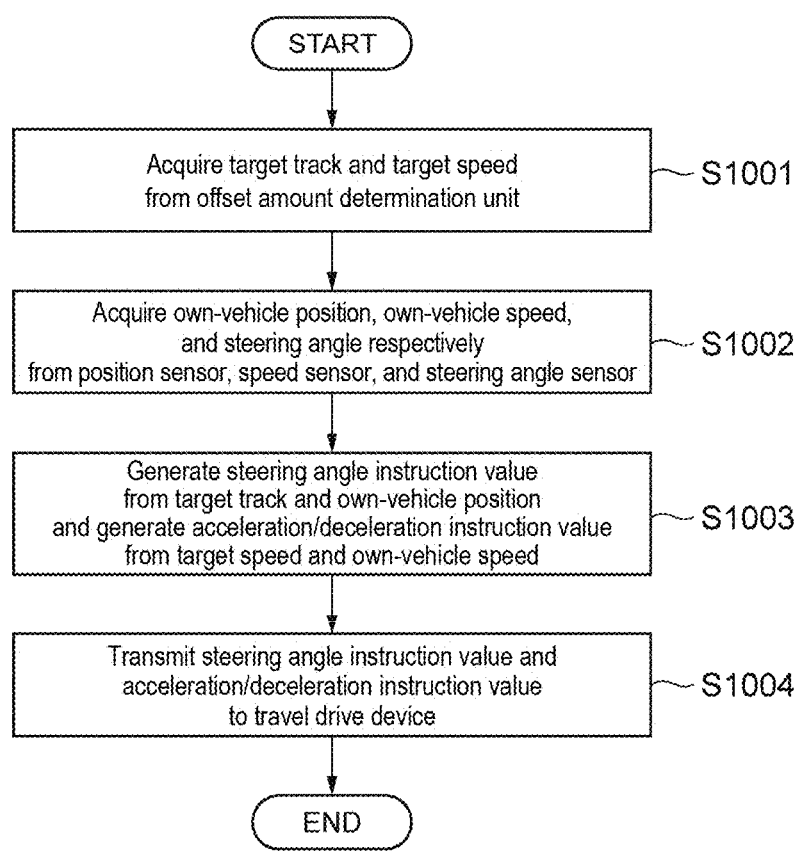
FIG. 10 is a flowchart of a process procedure of an autonomous travel control unit according to the first embodiment.

FIG. 10 is a flowchart of a process procedure of the autonomous travel control unit 201. The autonomous travel control unit 201 first acquires a target track and a target speed from the offset amount determination unit 202 (S1001). Next, the autonomous travel control unit 201 acquires an own-vehicle position, an own-vehicle speed, and a steering angle respectively from the position sensor 220, the speed sensor 230, and the steering angle sensor 260 (S1002). Then, the autonomous travel control unit 201 compares the target track with the own-vehicle position to generate a steering angle instruction value so that the own-vehicle position approaches the target track, and also compares the target speed with the own-vehicle speed to generate an acceleration/deceleration instruction value so that the own-vehicle speed approaches the target speed (S1003). Finally, the autonomous travel control unit 201 transmits to the travel drive device 210 the generated steering angle instruction value and acceleration/deceleration instruction value (i.e., travel instruction) (S1004).

As described above, with respect to each node of the travel path 60, the offset amount determination unit 202 determines an offset amount for every node and generates the target track 62, and then the offset information distribution unit 203 determines offset information so as to change the angle θ (for example, change of every several tens of degrees from the current direction of the offset amount) every time and distributes the determined offset information (described later). Accordingly, the target track 62, along which the unmanned vehicle 20 actually travels while tracking, can be displaced around the travel path 60, and since the unmanned vehicle 20 travels while tracking the target track 62, it is possible to suppress generation of ruts. In addition, since common offset information is used to determine the offset amount of the travel path 60 in all of the unmanned vehicles 20, the unmanned vehicles 20 passing each other on the transportation path travel with displacement in the same direction. This can avoid a collision risk due to the proximity of the unmanned vehicles 20.

Figure 7:
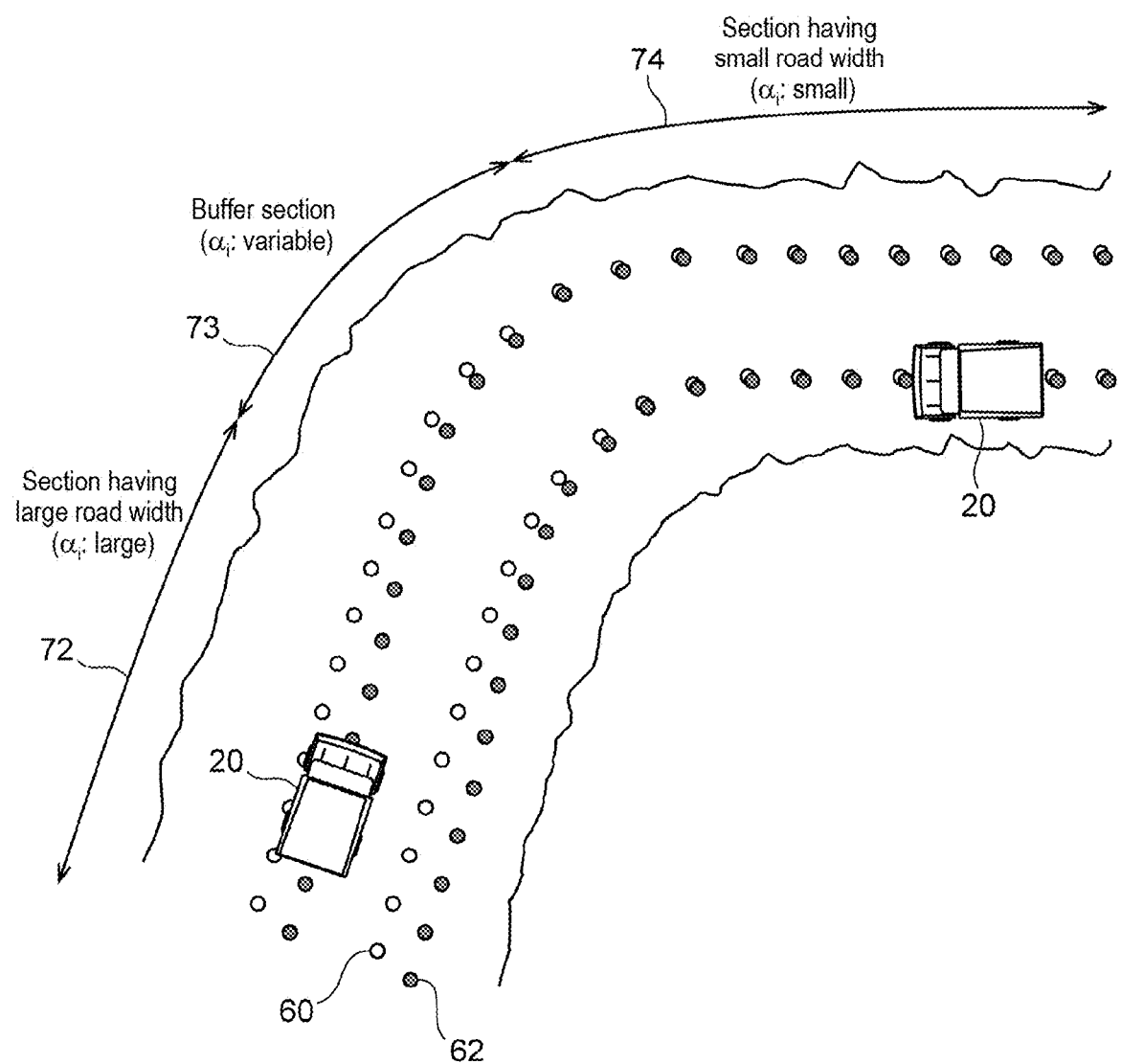
FIG. 7 illustrates an example of generating a target track based on an offset amount according to a road width.
Figure 8:
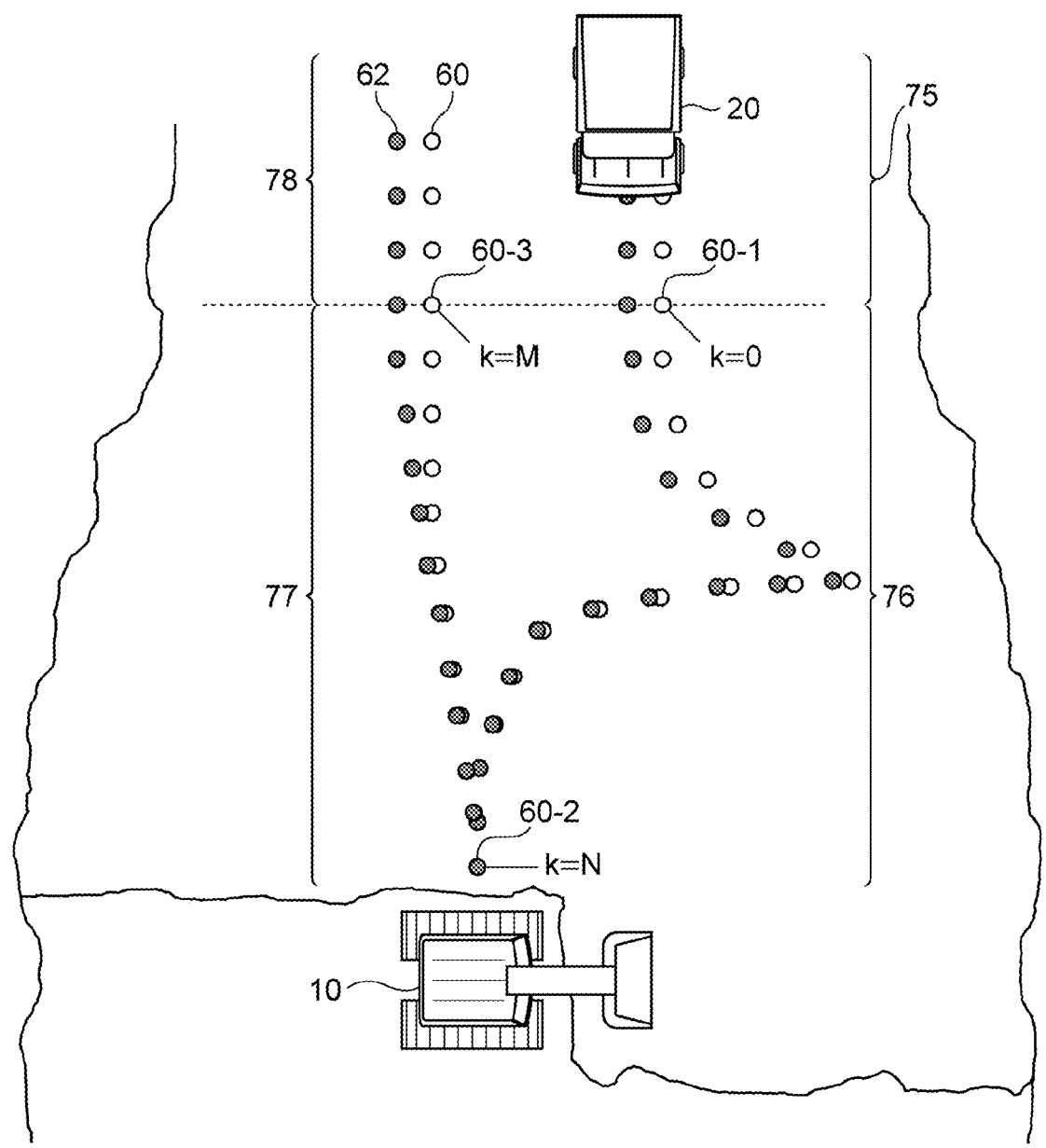
FIG. 8 illustrates an example of generating a target track based on an offset amount determined considering a fixed work point.

Next, with reference to FIG. 7 and FIG. 8, the following describes advantages of the feature in which different offset amounts can be set to each node.

FIG. 7 illustrates an example of generating a target track based on an offset amount according to a road width. The offset factor $\alpha_i$ of each node set in advance in the map information 251 is determined as a distance by which the travel path 60 can be offset considering the distance to the road shoulder (corresponding to a road width) on each point. For example, in a section 72 having a large road width, the offset factor $\alpha_i$ of each node is set relatively large, and in a section 74 having a small road width, the offset factor $\alpha_i$ of each node is set relatively small. Then, in a section 73 between these sections as a buffer section, for example, the offset factor $\alpha_i$ of each node may be set such that the offset factor $\alpha_i$ is continuously changed to linearly interpolate the values in the adjacent sections. For example, in the travel path 60 from the section 72 toward the section 74, $\alpha_w$ and $\alpha_n$ are respectively set as the offset factor of the section 72 and the offset factor of the section 74 based on the road width of each section. Then, when the number of nodes in the buffer section 73 is N, provided that the offset factor of kth node in the buffer section 73 is $\alpha^k$ (k=1, . . . , N), $\alpha^k$ can be calculated by the following equation:

[Equation 3]

$$\alpha^k = k \times (\alpha_n - \alpha_w)/N + \alpha_w \quad \text{(Equation 3)}$$

Since the above configuration allows adjusting the displacement level of the target track 62 of the unmanned vehicle 20 within an acceptable range according to the road width of each section, it is possible to suppress generation of ruts more certainly in the section having a large road width, and prevent the unmanned vehicle 20 from interfering with the road shoulder in the section having a small road width. Also in the section therebetween, it is possible to continuously change the magnitude of the offset amount so as to smoothly connect the target track 62.

FIG. 8 illustrates an example of generating a target track based on an offset amount determined considering a fixed work point, such as a loading point of the excavator 10 or the like. A node 60-2 is defined by coordinates of the fixed work point on which the unmanned vehicle 20 should stop with its own-vehicle position matched therewith so that the excavator 10 performs loading work for the unmanned vehicle 20. In addition, among a section 75 to a section 78 of the travel path 60, the section 75 and the section 78 are located on the transportation path and the section 76 and the section 77 are located within the wide loading place. The section 76 includes a node for a switchback so that the unmanned vehicle 20 approaches the excavator 10 while moving backward.

In the travel path 60 including such a fixed work point, when the offset factor $\alpha_i=0$ is set, it is possible to match the target track 62 and the original travel path 60 at the node of the fixed work point and, control the unmanned vehicle 20 to stop at a desired position also in the present control. For example, when an offset factor of each node in the sections 76, 77 is determined by linear interpolation, first, the following are set: in the section 76, the number of nodes is N (the final node is the fixed work point); in the section 77, the number of nodes is (M−N); in the sections 76, 77, the offset factor of the kth node is $\alpha^k$ (k=1, . . . , N, . . . , M); in the section 75. the offset factor of the final node 60-1 is formally $\alpha^0$; each of $\alpha^0$ and, in the section 77, the offset factor $\alpha^M$ (corresponding to the offset factor of the section 78) of the final node 60-3 is a constant. Then, the offset factor $\alpha^k$ (k=1, ..., N, ..., M−1) therebetween can be calculated by the following equations:

[Equation 4]

$$\alpha^k = \alpha^0 \times (N-k)/N,\ 1 \le k \le N \quad \text{(Equation 4)}$$

[Equation 5]

$$\alpha^k = \alpha^M \times (k-N)/(M-N),\ N < k \le M-1 \quad \text{(Equation 5)}$$

By determining the offset factors in the travel path 60 including the fixed work point as described above, the target track 62 can be matched with the original travel path 60 at a desired position (i.e., the fixed work point) where the unmanned vehicle 20 should stop. In addition, at the point adjacent to the desired position (i.e., the fixed work point), it is possible to displace the track and suppress generation of ruts while smoothly connecting the target track 62.

Next, with reference to FIGS. 11(*a*) to (*c*) and FIG. 12, the operation of the offset information distribution unit 203 to update offset information will be described.

When a change in the state of the body set in advance is detected, the offset information distribution unit 203 determines offset information based on the offset information currently held therein, and distributes the latest offset information to all of the unmanned vehicles 20 via the wireless communication device 240. All of the unmanned vehicles 20 (specifically, the unmanned vehicles 20 other than the unmanned vehicle 20 that has distributed the latest offset information) receive the latest (common) offset information transmitted by a certain unmanned vehicle 20 (or the offset information distribution unit 203 thereof) via the wireless communication device 240 and update offset information used by the offset amount determination unit 202 of the own vehicle, then determine the offset amount of each node (travel path 60), generate the target track 62, and control tracking to the target track 62 as described above. It should be noted that the unmanned vehicle 20 that distributes the latest offset information can update, using the latest offset information, offset information used by the offset amount determination unit 202 of the own vehicle. In the present embodiment, an example in which the unmanned vehicle 20 updates offset information when the load sensor 270 detects that dumping has completed (dumping work has completed) will be described.

Figure 11A:
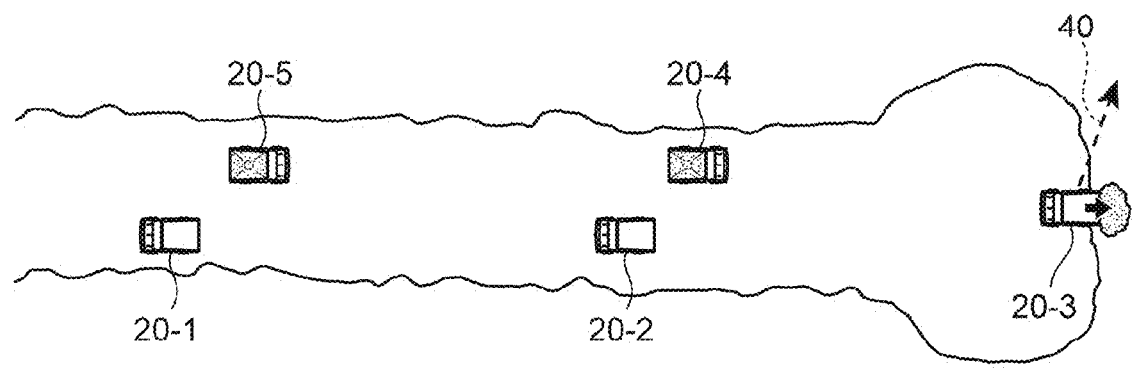
FIGS. 11A to C illustrate a travel trajectory of an unmanned vehicle.
Figure 11B:
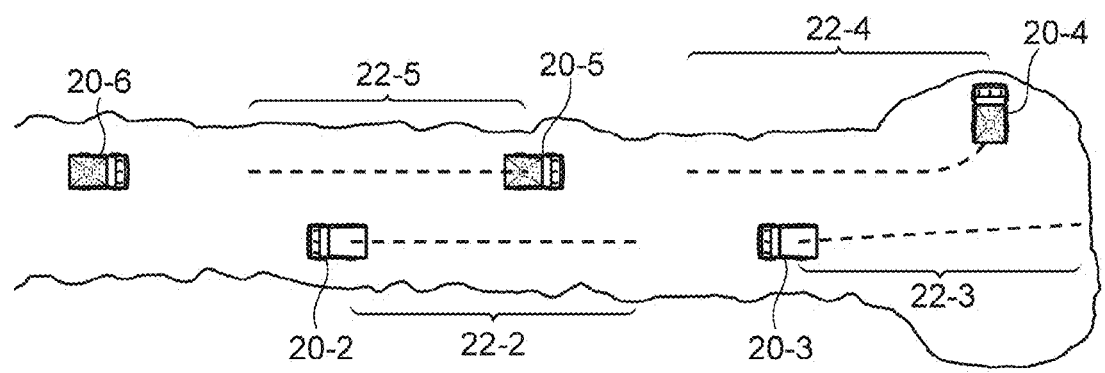
Figure 11C:
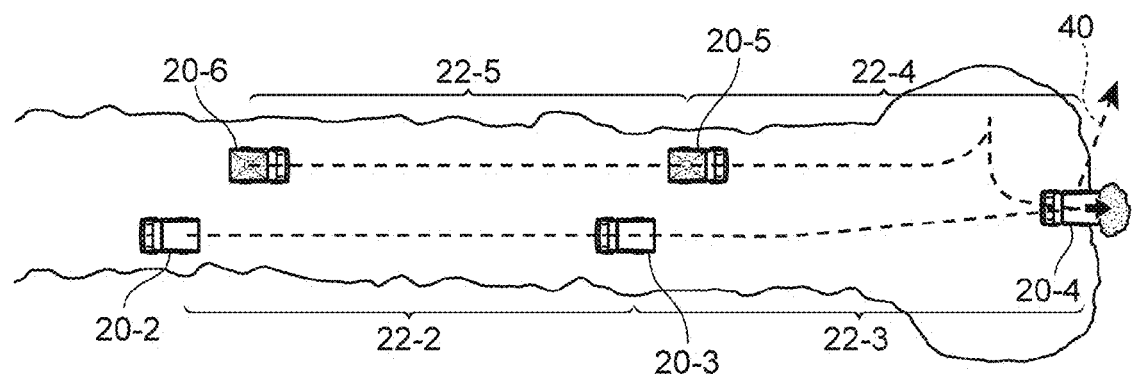

FIGS. 11(*a*) to (*c*) illustrate a travel trajectory of the unmanned vehicle 20 on a dumping place and a transportation path around it. FIG. 11(*a*) illustrates a situation at a time when an unmanned vehicle 20-3 performs dumping. FIG. 11(*b*) illustrates a situation at a time when a following unmanned vehicle 20-4 is at a switch-back point. FIG. 11(*c*) illustrates a situation at a time when the following unmanned vehicle 20-4 performs dumping.

In FIG. 11(*a*), when the unmanned vehicle 20-3 has completed dumping, at the same time, the offset information distribution unit 203 obtains, as new offset information, $\theta+\Delta\theta$ by adding a predetermined change $\Delta\theta$ (for example, several tens of degrees) to the angle $\theta$, which is the offset information currently held therein, and distributes the new offset information to all of the unmanned vehicles 20 via the wireless communication device 240. That is, when transmitting offset information, the offset information distribution unit 203 of the unmanned vehicle 20-3 changes the angle $\theta$ (direction of the offset amount), which is the offset information currently held therein, by a predetermined angle $\Delta\theta$ from the current direction, and updates the offset information. Accordingly, the target track 62, along which the unmanned vehicle 20 actually travels while tracking, can be displaced around the travel path 60. Next, in FIG. 11(*b*), the unmanned vehicle 20-4, which is the vehicle following the unmanned vehicle 20-3, is at the switch-back point. At this time, sections in which the unmanned vehicles 20-2, 20-3, 20-4, 20-5 have traveled by the current time after the time illustrated in FIG. 11(*a*) are indicated by dashed lines 22-2, 22-3, 22-4, 22-5, respectively. Since these sections cannot cover the whole travel path, updating again the offset information at this timing may generate, in the target track based on the current offset information, a section in which the unmanned vehicle 20 has actually traveled and a section in which the unmanned vehicle 20 has not traveled. This may cause nonuniform displacement of the actual travel track in the advancing direction on the travel path. Meanwhile, in FIG. 11(*c*) illustrating the situation after some time has passed and the unmanned vehicle 20-4 has completed dumping, the sections 22-2, 22-3, 22-4, 22-5 illustrated in FIG. 11(*b*) are further extended and now cover all sections in the travel path. If the offset information distribution unit 203 can update offset information after the time illustrated in FIG. 11(*a*) and at the timing illustrated in FIG. 11(*c*), the sections in which the unmanned vehicle 20 has actually traveled along the target track based on the current offset information can cover the whole transportation path. This allows the actual travel track to be uniformly displaced also in the advancing direction on the travel path. Accordingly, when the unmanned vehicle 20-4 has completed dumping, at the same time, the offset information distribution unit 203 obtains, as new offset information, $\theta+\Delta\theta$ by adding a predetermined change $\Delta\theta$ (for example, several tens of degrees) to the angle $\theta$, which is the offset information currently held therein, and distributes the new offset information to all of the unmanned vehicles 20 via the wireless communication device 240. That is, when transmitting offset information, the offset information distribution unit 203 of the unmanned vehicle 20-4 changes the angle $\theta$ (direction of the offset amount), which is the offset information currently held therein, by a predetermined angle $\Delta\theta$ from the current direction, and updates the offset information.

As described above, updating offset information at a timing when the unmanned vehicle 20 has completed dumping can synchronize travel time intervals of the unmanned vehicles 20 and time intervals for updating offset information. This allows the whole travel path 60 to be covered by the sections in which the unmanned vehicle 20 actually travels along the target track 62 using offset information. Therefore, it is possible to uniformly displace the travel track also in the advancing direction on the path and suppress generation of ruts.

Figure 12:
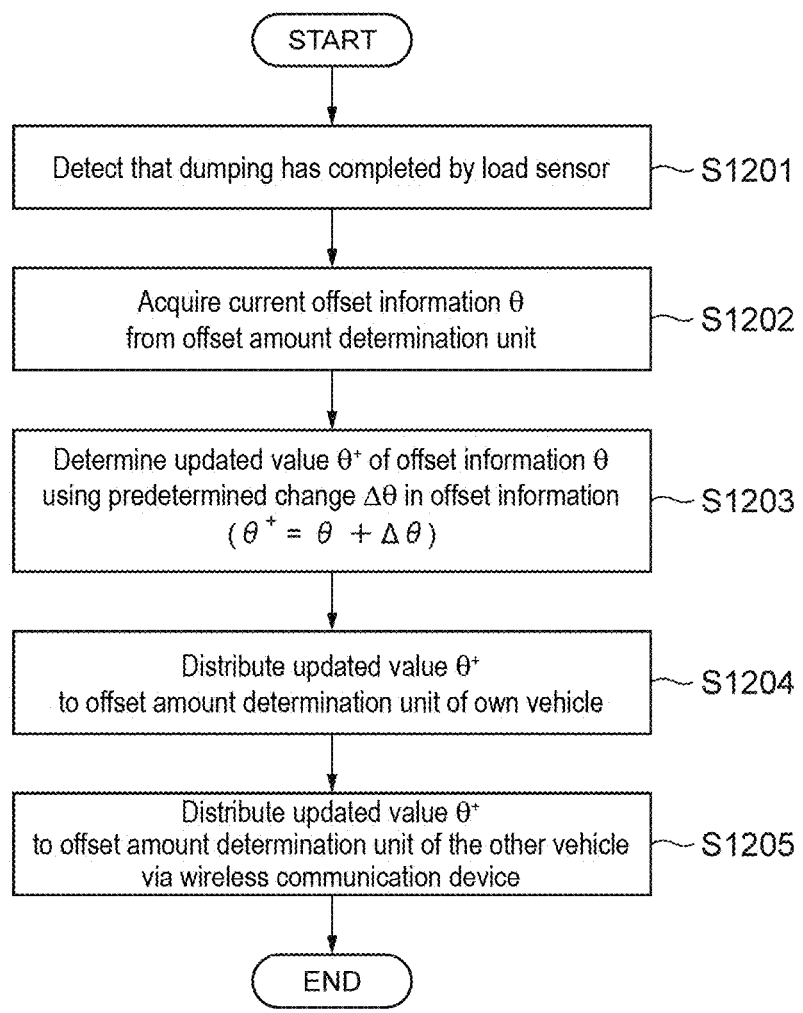
FIG. 12 is a flowchart of a process procedure of an offset information distribution unit according to the first embodiment.

FIG. 12 is a flowchart of a process procedure of the offset information distribution unit 203. First, if the offset information distribution unit 203 determines that the loaded state has been changed to the empty load state based on a change in the payload weight measured by the load sensor 270, the offset information distribution unit 203 detects that dumping has completed (S1201). Next, the offset information distribution unit 203 acquires from the offset amount determination unit 202 offset information $\theta$, which is currently used (S1202), and determines new offset information (updated value) $\theta^+$ based on the currently used offset information $\theta$ (S1203). For example, the offset information distribution unit 203 adds a predetermined change $\Delta\theta$ to the angle $\theta$, which is currently used, and determines, as new offset information (updated value) $\theta^+$, angle $\theta+\Delta\theta$ (i.e., a direction obtained by changing the direction of the offset amount from the current direction by a predetermined angle). Then, the offset information distribution unit 203 distributes the new offset information $\theta^+$ to the offset amount determination unit 202 of the own vehicle and updates the offset information used by the offset amount determination unit 202 of the own vehicle (S1204), and distributes the same new offset information $\theta^+$ also to the offset amount determination unit 202 of the other vehicle via the wireless communication device 240 (S1205). In the present embodiment, distributing offset information from the own vehicle to the other vehicle and receiving offset information at the other vehicle can be performed by intervehicle communication, not via a control station.

Figure 13:
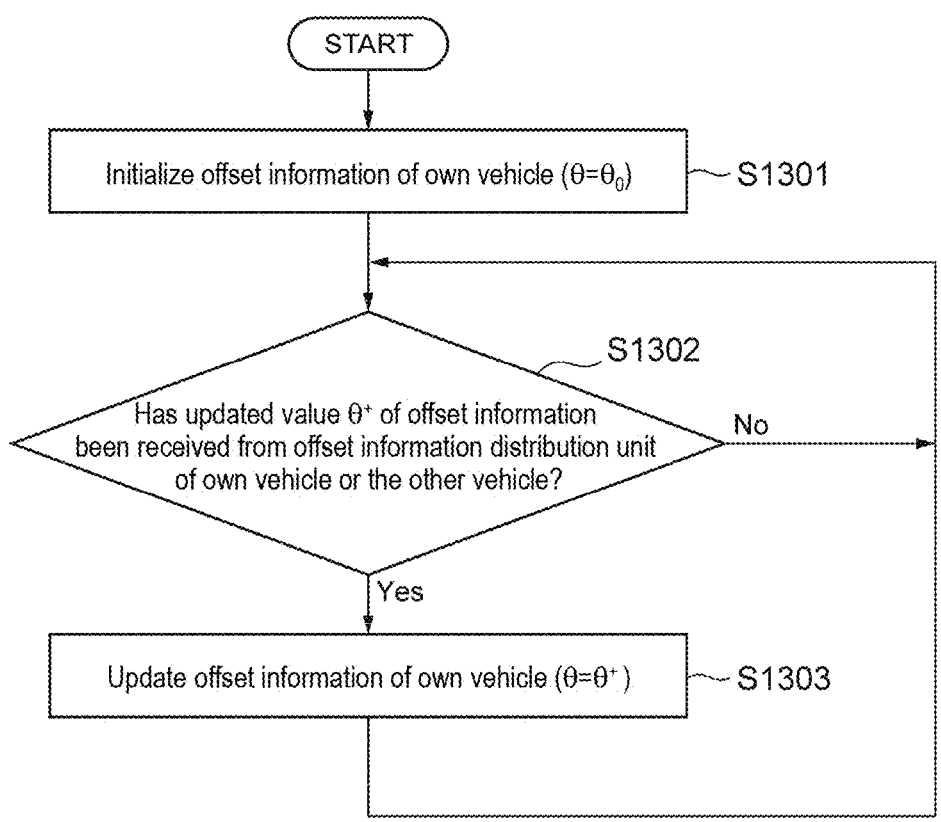
FIG. 13 is a flowchart of a process procedure of updating offset information held by the offset amount determination unit according to the first embodiment.

FIG. 13 is a flowchart of a process procedure of updating the offset information held by the offset amount determination unit 202 when offset information is received from the other vehicle. First, the offset amount determination unit 202 initializes the offset information ($\theta=\theta_0$) of the own vehicle at a predetermined timing (for example, on startup or the like) (S1301). Next, the offset amount determination unit 202 determines whether new offset information (updated value) $\theta^+$ has been received from the offset information distribution unit 203 of the own vehicle or the other vehicle (S1302), and if received (S1302/Yes), updates ($\theta=\theta^+$) the offset information of the own vehicle using the received updated value $\theta^+$ (S1303).

Through the update processes of FIG. 12 and FIG. 13, the unmanned vehicles 20 can standardize (share) the offset information generated by each vehicle.

It should be noted that in the present embodiment, although the update and distribution of offset information is performed at a dumping completion timing, as long as the timing of the update and distribution of offset information is a timing in accordance with the operation period of the unmanned vehicle 20, such as a timing when loading starts, loading completes, dumping starts, the unmanned vehicle 20 passes a specific point on the travel path, and the like, the offset information can be updated in synchronous with the travel time intervals of the unmanned vehicles 20, and the same advantageous effect can be obtained. In the same manner as the dumping completion timing, a timing when loading starts, loading completes, dumping starts, and the like can be detected based on the load condition of the body acquired by the load sensor 270, specifically, a change in the body weight acquired by the load sensor 270. However, in the present example, it is desirable that offset information be updated and distributed and the offset information be received at the other vehicle via the wireless communication device 240 at a predetermined timing based on (i.e., associated with) the load condition of the body acquired by the load sensor 270, specifically when the load sensor 270 detects a change in the body weight related to when dumping work completes, dumping work starts, loading work starts, or loading work completes, rather than when the unmanned vehicle 20 passes a specific point on the travel path.

In addition, to avoid a situation in which wireless communication is disconnected at a timing when offset information is distributed and the offset information cannot be received, each unmanned vehicle 20 may manage a timing of updating offset information based on the time held in each unmanned vehicle 20. In such a case, to synchronize timings of updating offset information in the unmanned vehicles 20, as in the above-described manner, an offset information updating message is transmitted to other vehicles when dumping has completed, and the update periods are synchronized in the unmanned vehicles 20.

As described above, according to the present embodiment, with reference to the map information 251 representing the travel path 60 of the unmanned vehicle 20, all of the unmanned vehicles 20 in the autonomous travel system 1 can generate the target track 62 obtained by offsetting the travel path 60 using common offset information. In addition, since it is possible to displace the target track 62 by changing (updating) offset information at a predetermined timing, it is possible to displace the travel position of the unmanned vehicle 20 with respect to the travel path 60 in the width direction of the path, whereby generation of ruts can be effectively suppressed. In addition, since it is possible to offset the target track 62 in the same direction by generating the target track 62 using the common offset information among all of the unmanned vehicles 20, the unmanned vehicles 20 traveling in opposite lanes can pass each other without approaching, while maintaining a safe distance therebetween.

In addition, according to the present embodiment, since it is possible to set a magnitude of an offset amount according to the road width on each point on the travel path 60 by determining an offset factor for each point, for example, it is possible to suppress generation of ruts by increasing an offset amount in a place having a large road width and prevent the unmanned vehicle 20 from interfering with the road shoulder by decreasing an offset amount in a place having a small road width. Furthermore, since the target track 62 matching with the original travel path 60 can be generated by setting an offset amount of 0 in the fixed work point, such as a loading position, for example, it is also possible to set the target track 62 such that the unmanned vehicle 20 passes a required work point.

In addition, according to the present embodiment, since each unmanned vehicle 20 updates offset information at a predetermined timing (for example, a timing when dumping has completed), it is possible to synchronize travel time intervals of the unmanned vehicles 20 and time intervals for updating offset information. This allows the target track 62 based on each piece of offset information to cover the whole travel path. Accordingly, the travel track can be uniformly displaced also in the advancing direction on the travel path, and generation of ruts can further be suppressed.

Second Embodiment

A second embodiment applies the method of the first embodiment, and the following describes a method in which the offset amount determination unit 202 determines an offset amount according to the load condition of the unmanned vehicle 20. Hereinafter, description of configurations and operations that overlap with those of the first embodiment will be omitted, and the following describes only different parts.

FIG. 14 illustrates an example of data representing the map information 251 according to the second embodiment. In the present embodiment, each node of the map information 251 holds both of an empty-load offset factor and a load offset factor.

Figure 15:
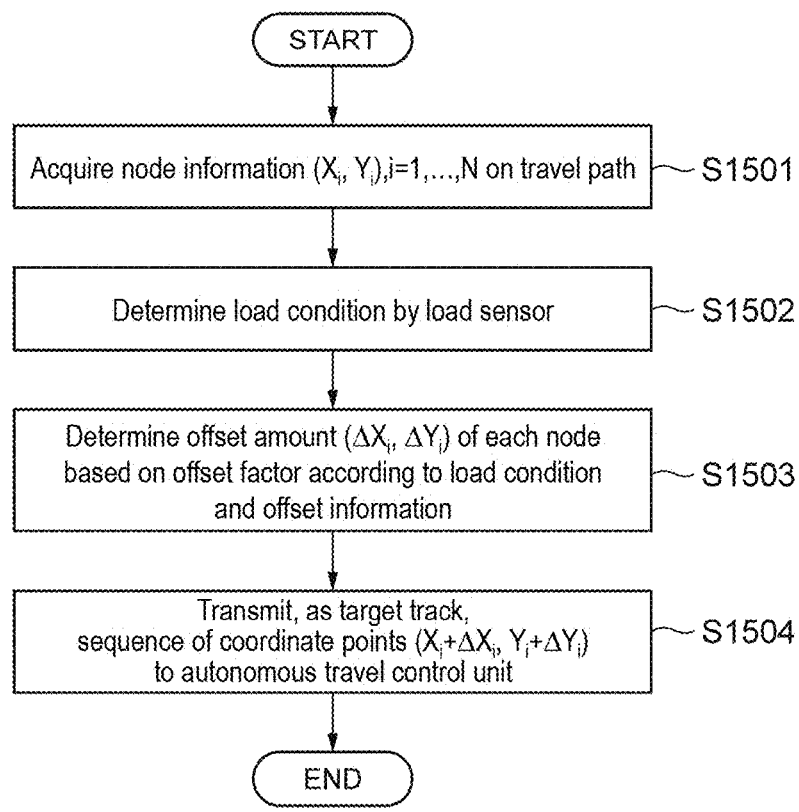
FIG. 15 is a flowchart of a process procedure of the offset amount determination unit according to the second embodiment.

FIG. 15 is a flowchart of a process procedure of the offset amount determination unit 202 according to the present embodiment. The offset amount determination unit 202 first acquires node information (coordinates: ($X_i$, $Y_i$), i=1, . . . , N) on the travel path 60 from the map information 251 in the storage device 250 (S1501). Next, the offset amount determination unit 202 determines, based on information obtained by the load sensor 270, the load condition of the own vehicle, that is, whether the own vehicle is in the loaded state or the empty load state (S1502). Then, in the acquired node information on the travel path 60, the offset amount determination unit 202 acquires (selects) an offset factor according to the load condition of the own vehicle, that is, either a load offset factor when the own vehicle is in the loaded state or an empty-load offset factor when the own vehicle is in the empty load state, and determines an offset amount of each node ($\Delta X_i$, $\Delta Y_i$) using the acquired offset factor and the latest (common) offset information distributed by the offset information distribution unit 203 of the own vehicle or the other vehicle (S1503). Then, finally, the offset amount determination unit 202 transmits, as the target track 62, a sequence of coordinate points ($X_i+\Delta X_i$, $Y_i+\Delta Y_i$) obtained by adding the offset amount to the coordinates of the original nodes to the autonomous travel control unit 201 (S1504).

Figure 16:
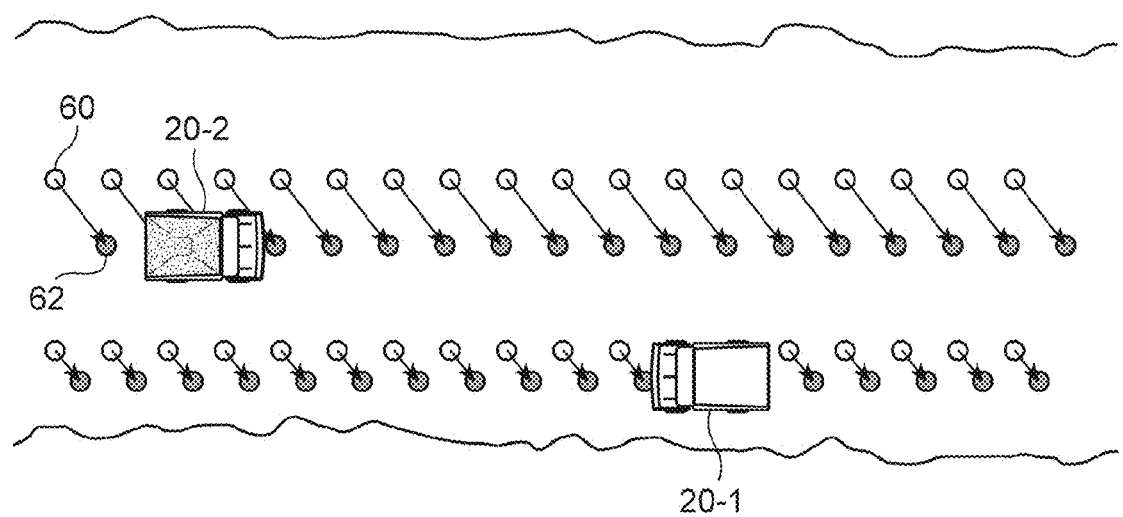
FIG. 16 illustrates an example of changing an offset amount according to a load condition.

FIG. 16 illustrates a target track using an offset amount according to the load condition of the unmanned vehicle 20. In FIG. 16, the unmanned vehicle 20-1 is a vehicle (moving from the dumping place to the loading place) in the empty load state, and the unmanned vehicle 20-2 is a vehicle (moving from the loading place to the dumping place) in the loaded state. The load offset factor (i.e., the offset factor when the body weight is relatively large) is set larger than the empty-load offset factor (i.e., the offset factor when the body weight is relatively small), so that the unmanned vehicle 20 when loaded can more largely displace the target track 62 with respect to the travel path 60. In this case, it is required to set values of offset factors considering a road width and a distance to an opposite lane such that there is a sufficient distance, if offset, to the on-coming vehicle.

According to the present embodiment, the offset amount determination unit 202 determines an offset amount according to the load condition (e.g., a change in the body weight) of the unmanned vehicle 20. Specifically, the offset amount determination unit 202 holds in advance, as the map information 251, an offset factor when the unmanned vehicle 20 is unloaded and an offset factor when the unmanned vehicle 20 is loaded at each node (each point), and selects an offset factor to be used for determination of an offset amount based on the load condition (e.g., a change in the body weight) of the unmanned vehicle 20. This can displace the target track 62 more largely for the vehicle in the loaded state, which tends to put a large load on the road surface and generate a rut, than in the empty load state. Thus, it is possible to reduce the likelihood that, in the transportation path, the travel path on which the loaded vehicles frequently travel, that is, the travel path from the loading place toward the dumping place, and the like, will have more ruts than the travel path on which the unloaded vehicles on the opposite lane frequently travel, that is, the travel path from the dumping place toward the loading place.

In addition, the offset amount determination unit 202 may not independently hold an offset factor according to the load condition as in the present embodiment, and may determine an offset amount of each node considering (in view of) a total weight of the body using a single offset factor as illustrated in FIG. 3. In such a case, using the offset factor $\alpha_i$ and a total weight M of the body acquired by the load sensor 270, an offset amount ($\Delta X_i$, $\Delta Y_i$) regarding the node i can be calculated by the following equations:

[Equation 6]

$$\Delta X_i = \alpha_i \times M \times \cos\theta \quad \text{(Equation 6)}$$

[Equation 7]

$$\Delta Y_i = \alpha_i \times M \times \sin\theta \quad \text{(Equation 7)}$$

With such a configuration, also when each node of the map information 251 has a single offset factor, it is possible to give an offset amount considering the load condition of the body, and for the vehicle in the loaded state, which puts a large load on the road surface when traveling, it is possible to displace the target track 62 more largely than for the vehicle in the empty load state, and suppress generation of ruts.

As in the first embodiment, since it is possible to offset the target track 62 in the same direction by generating the target track 62 using the common offset information among all of the unmanned vehicles 20, the unmanned vehicles 20 traveling in opposite lanes can pass each other without approaching, while maintaining a safe distance therebetween.

Third Embodiment

A third embodiment applies the method of the first embodiment, and the following describes an example in which offset information is distributed to the unmanned vehicle 20 via a control station (not by intervehicle communication) and all of the unmanned vehicles 20 receive offset information via the control station. Hereinafter, description of configurations and operations that overlap with those of the first embodiment will be omitted, and the following describes only different parts.

Figure 17:
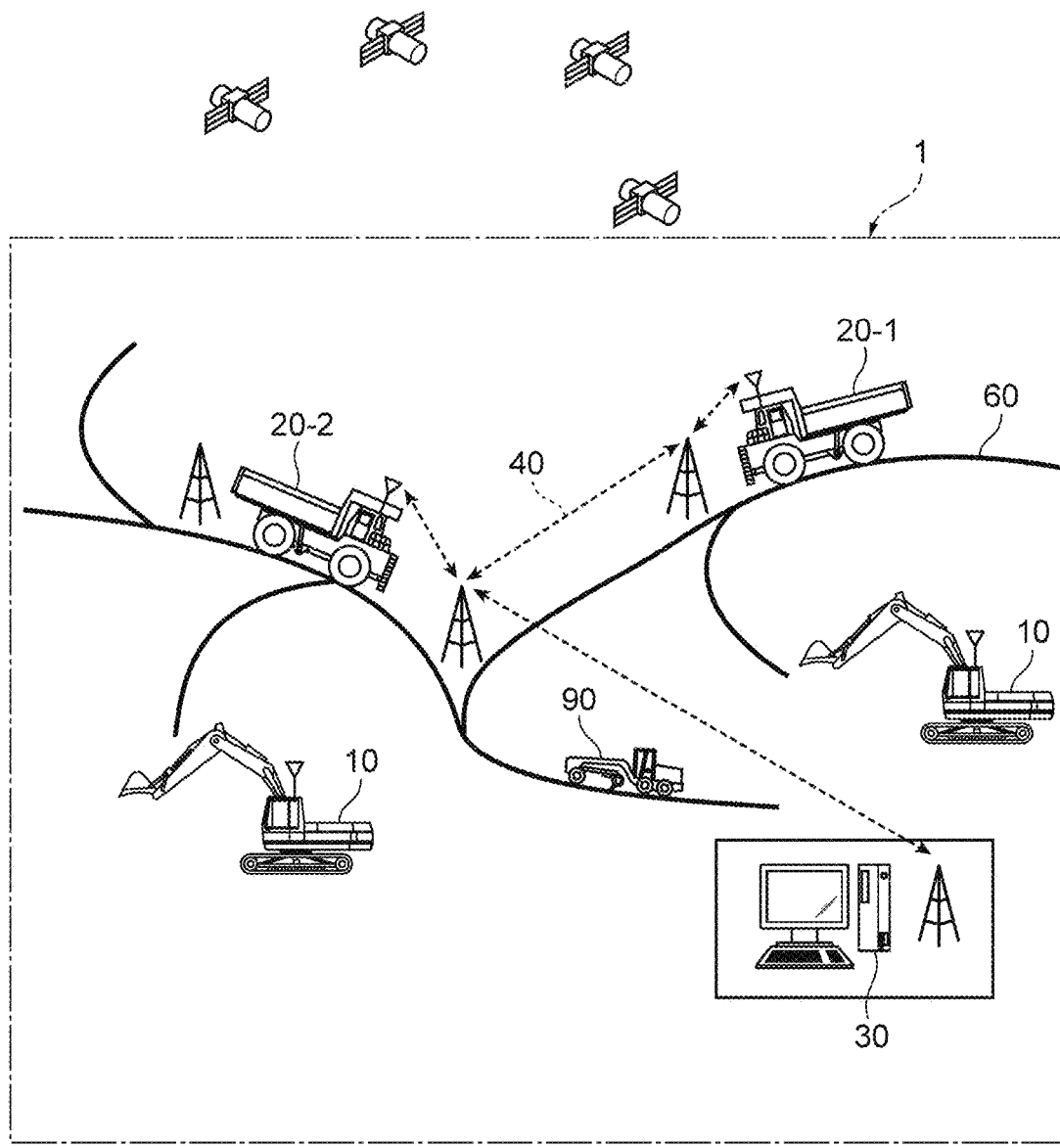
FIG. 17 is a diagram illustrating a schematic configuration of an autonomous travel system according to a third embodiment.

FIG. 17 is a diagram illustrating a schematic configuration of the autonomous travel system 1 according to the third embodiment. In addition to the configuration of the first embodiment, the autonomous travel system 1 of the present embodiment includes a control station 30 that is communicably connected to the unmanned vehicles 20 via the wireless network 40.

Figure 18:
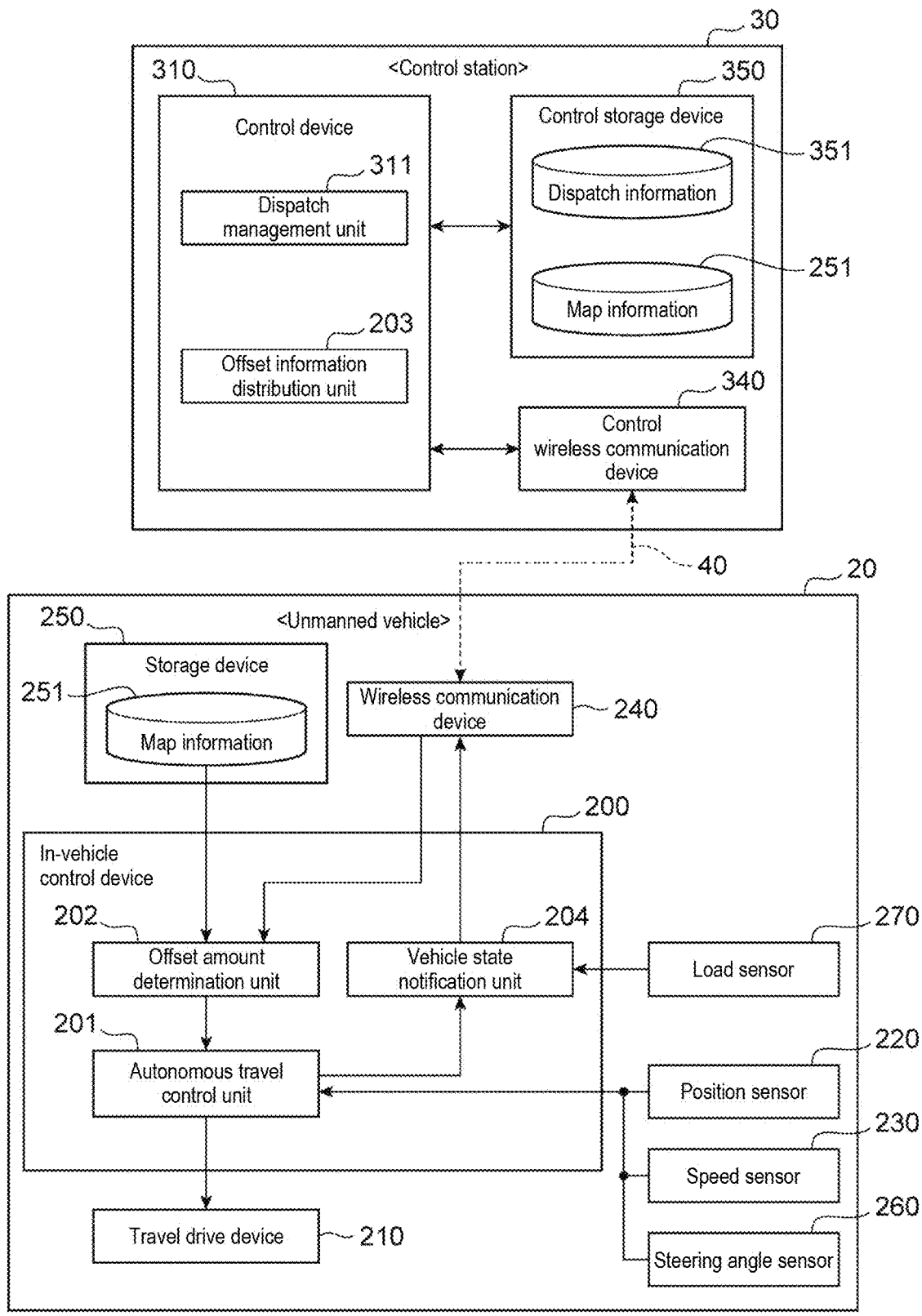
FIG. 18 is a block diagram of the autonomous travel system according to the third embodiment.

FIG. 18 is a block diagram of the autonomous travel system 1 according to the third embodiment. The autonomous travel system 1 includes the control station 30 and the plurality of unmanned vehicles 20.

The unmanned vehicle 20 of the present embodiment is different from that of the first embodiment (FIG. 2) in that the in-vehicle control device 200 does not include an offset information distribution unit 203 that determines and distributes offset information, but further includes a vehicle state notification unit 204 adapted to transmit body information based on data acquired from various sensors to the control station 30 via the wireless communication device 240. Except for such a configuration, the unmanned vehicle 20 of the present embodiment is equal to that of the first embodiment.

The vehicle state notification unit 204 transmits to the control station 30 at least the load condition of the unmanned vehicle 20 based on the data acquired from the load sensor 270.

The control station 30 includes a control device 310, a control storage device 350, and a control wireless communication device 340.

The control device 310 includes a CPU (central processing unit), RAM (random access memory), and ROM (read only memory), which individually perform calculation of a program, perform reading and writing information from and to a work area, and temporarily store the program, so as to control the operation of the control station 30.

The control storage device 350 is an information readable/writable non-volatile storage medium, and stores an operating system (OS), various control programs, application programs, databases, and the like.

The control wireless communication device 340 is radio equipment for connection to the wireless network 40, capable of communicating information with the outside.

The control device 310 includes a dispatch management unit 311 and an offset information distribution unit 203.

The control storage device 350 includes dispatch information 351 and map information 251. Herein, the map information 251 is common to that stored in the storage device 250 of the unmanned vehicle 20.

The dispatch management unit 311 of the control device 310 determines a destination of the unmanned vehicle 20 and a target path to reach the destination. For example, when the unmanned vehicle 20 is at the loading place, the dispatch management unit 311 sets a target path to reach the dumping place. When the unmanned vehicle 20 is at the dumping place, the dispatch management unit 311 sets a target path to reach the loading place.

FIG. 19 illustrates an example of a table of the dispatch information 351. The dispatch information 351 stores a vehicle ID that uniquely identifies each unmanned vehicle 20 and a target path determined by the dispatch management unit 311. The dispatch management unit 311 sets a target path of each unmanned vehicle 20 and, at the same time, transmits the target path to the appropriate unmanned vehicle 20 via the wireless network 40.

The offset information distribution unit 203 of the control device 310 determines offset information based on the information received from the vehicle state notification unit 204 of each unmanned vehicle 20, and distributes the offset information to the offset amount determination unit 202 of each unmanned vehicle 20 via the control wireless communication device 340 and the wireless network 40.

Figure 20:
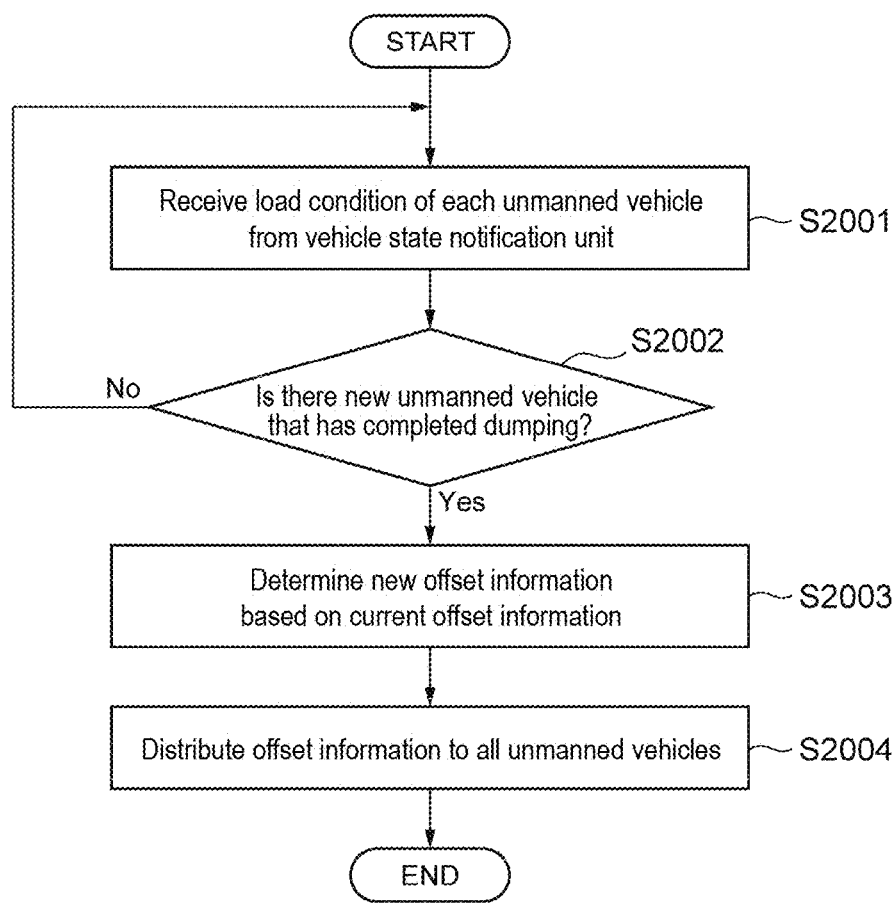
FIG. 20 is a flowchart of a process procedure of the offset information distribution unit according to the third embodiment.

FIG. 20 is a flowchart of a process flow of the offset information distribution unit 203 according to the present embodiment. The offset information distribution unit 203 receives the load condition of each unmanned vehicle 20 from the vehicle state notification unit 204 of each unmanned vehicle 20 (S2001). Based on the received load condition of each unmanned vehicle 20, the offset information distribution unit 203 determines whether there is a new unmanned vehicle 20 that has completed dumping (S2002). If there is no new unmanned vehicle 20 that has completed dumping (S2002/No), the offset information distribution unit 203 waits for next reception without any action. If there is a new unmanned vehicle 20 that has completed dumping (S2002/Yes), the offset information distribution unit 203 determines new offset information based on the set offset information. For example, the offset information distribution unit 203 determines, as new offset information, angle θ+Δθ (i.e., a direction obtained by changing the direction of the offset amount from the current direction by a predetermined angle) by adding a predetermined change Δθ (for example, several tens of degrees) to the angle θ that is currently used (S2003). Then, the offset information distribution unit 203 distributes the new offset information to all of the unmanned vehicles 20 (or the offset amount determination units 202 thereof) via the control wireless communication device 340 (S2004).

In response to the load condition of the unmanned vehicle 20 transmitted from the vehicle state notification unit 204 of a certain unmanned vehicle 20 (dumping completion timing, herein), as a trigger, all of the unmanned vehicles 20 receive, via the wireless communication devices 240, the latest (common) offset information transmitted from the offset information distribution unit 203 of the control station 30 and update the offset information used by the offset amount determination unit 202 of the own vehicle, then determine the offset amount of each node (travel path 60), generate the target track 62, and control tracking to the target track 62 as described above.

It should be noted that also in the present embodiment, in the same manner as the foregoing first embodiment, as long as the timing of the update and distribution of offset information is a timing in accordance with the operation period of the unmanned vehicle 20, such as a timing when loading starts, loading completes, dumping starts, the unmanned vehicle 20 passes a specific point on the travel path, and the like, other than the dumping completion timing, the offset information can be updated in synchronous with the travel time intervals of the unmanned vehicles 20, and the same advantageous effect can be obtained. However, also in the present example, it is desirable that offset information be updated and distributed at the control station 30 (or the offset information distribution unit 203 thereof) and the offset information be received at all of the unmanned vehicles 20 via the wireless communication devices 240 at a predetermined timing based on (i.e., associated with) the load condition of the body acquired by the load sensor 270, specifically when the load sensor 270 detects a change in the body weight related to when dumping work completes, dumping work starts, loading work starts, or loading work completes, rather than when the unmanned vehicle 20 passes a specific point on the travel path.

According to the present embodiment, since the control station 30 has control over determination of offset information and distributes the offset information to all of the unmanned vehicles 20, and each unmanned vehicle 20 determines an offset amount based on the offset information distributed from the control station 30 and received via the wireless communication device 240 and displaces the target track 62, it is possible to effectively suppress generation of ruts. In addition, since all of the unmanned vehicles 20 generate the target track 62 using the common offset information distributed from the control station 30 and received via the wireless communication devices 240 so as to offset the target track 62 in the same direction as in the first embodiment, the unmanned vehicles 20 traveling in opposite lanes can pass each other without approaching, while maintaining a safe distance therebetween. Furthermore, since the control station 30 has control over distribution of offset information, it is also possible to selectively distribute offset information to only the unmanned vehicles 20 having the same target path based on the dispatch information 351.

It should be noted that the present invention is not limited to the above embodiments, and various modifications can be included in the technical scope of the present invention without departing from the spirit of the present invention.

The present invention is not limited to the aforementioned embodiments, and includes a variety of variations. For example, although the aforementioned embodiments have been described in detail to clearly illustrate the present invention, the present invention need not include all of the structures described in the embodiments. It is possible to replace a part of a structure of an embodiment with a structure of another embodiment. In addition, it is also possible to add, to a structure of an embodiment, a structure of another embodiment. Further, it is also possible to, for a part of a structure of each embodiment, add, remove, or substitute a structure of another embodiment.

Some or all of the aforementioned structures, functions, processing units, processing means, and the like may be implemented as hardware by designing them into an integrated circuit, for example. Alternatively, each of the aforementioned structures, functions, and the like may be implemented as software such that a processor analyzes and executes a program that implements each function. Information such as the program that implements each function, tables, and files can be stored in a storage device such as memory, a hard disk, or a SSD (Solid State Drive); or a storage medium such as an IC card, an SD card, or a DVD.

In addition, the control lines and information lines represent those that are considered to be necessary for the description, and do not necessarily represent all of the control lines and information lines that are necessary for a product. Thus, in practice, almost all of the elements may be mutually connected.

REFERENCE SIGNS LIST

1 Autonomous travel system
10 Excavator
20 Unmanned vehicle (vehicle)
30 Control station
40 Wireless network
60 Travel path
62 Target track
90 Manned vehicle
200 In-vehicle control device
201 Autonomous travel control unit
202 Offset amount determination unit
203 Offset information distribution unit
204 Vehicle state notification unit
210 Traveling drive device
220 Position sensor
230 Speed sensor
240 Wireless communication device
250 Storage device
251 Map information
260 Steering angle sensor
270 Load sensor
280 Time management device
310 Control device
311 Dispatch management unit
340 Control wireless communication device
350 Control storage device
351 Dispatch information

The invention claimed is:

1. An autonomous travel system comprising a plurality of vehicles, each including: a travel drive device adapted to drive a body; a position sensor for acquiring an own-vehicle position; a storage device storing map information; an in-vehicle control device adapted to, based on the own-vehicle position and the map information, output to the travel drive device a travel instruction to control traveling of the body so as to track a travel path based on the map information; and a wireless communication device that can communicate information with an outside,
wherein the plurality of vehicles traveling at different locations in the autonomous travel system receives common offset information via the wireless communication device of each vehicle at a common timing, and
wherein based on common offset information received via the wireless communication device of each vehicle, the in-vehicle control device of each of the plurality of vehicles determines an offset amount of the travel path of the vehicle based on the map information of the vehicle, generates a target track, and outputs a travel instruction to control traveling of the body of the vehicle so as to track the target track to which the offset amount has been added based on the target track and the own-vehicle position of the vehicle.

2. The autonomous travel system according to claim 1, each of the plurality of vehicles further including a load sensor for acquiring a load condition of a body,
wherein the plurality of vehicles receives the common offset information via the wireless communication device at a predetermined timing based on the load condition of the body acquired by the load sensor of one of the plurality of vehicles.

3. The autonomous travel system according to claim 2, wherein the plurality of vehicles receives the common offset information via the wireless communication device when the load sensor of one of the plurality of vehicles detects a change in a body weight related to when dumping work completes, dumping work starts, loading work starts, or loading work completes.

4. The autonomous travel system according to claim 1, each of the plurality of vehicles further including a load sensor for acquiring a load condition of a body,
wherein the in-vehicle control device transmits offset information of an own vehicle via the wireless communication device at a predetermined timing based on the load condition of the body acquired by the load sensor.

5. The autonomous travel system according to claim 4, wherein the in-vehicle control device transmits the offset information of the own vehicle via the wireless communication device when the load sensor detects a change in a body weight related to when dumping work completes, dumping work starts, loading work starts, or loading work completes.

6. The autonomous travel system according to claim 4, wherein the offset information of the own vehicle includes a direction of the offset amount.

7. The autonomous travel system according to claim 6, wherein when transmitting the offset information of the own vehicle, the in-vehicle control device changes the direction of the offset amount from a current direction by a predetermined angle.

8. The autonomous travel system according to claim 6, wherein:
the map information holds an offset factor at each point, and
the in-vehicle control device determines the offset amount at each point based on the direction of the offset amount and the offset factor.

9. The autonomous travel system according to claim 8, wherein the in-vehicle control device determines the offset amount at each point according to a road width at each point or in consideration of a fixed work point on which the vehicle should stop.

10. The autonomous travel system according to claim 1, each of the plurality of vehicles further including a load sensor for acquiring a load condition of a body,
wherein the in-vehicle control device determines the offset amount based on the load condition of the body acquired by the load sensor.

11. The autonomous travel system according to claim 10, wherein:
the map information holds an offset factor in an empty load state and an offset factor in a loaded state at each point, and
the in-vehicle control device selects an offset factor to be used for determination of the offset amount based on the load condition of the body acquired by the load sensor.

12. The autonomous travel system according to claim 10, wherein:
the map information holds an offset factor at each point, and
the in-vehicle control device determines the offset amount at each point considering a total weight of the body acquired by the load sensor using the offset factor.

13. The autonomous travel system according to claim 1, wherein the plurality of vehicles receives, through a control station, the common offset information via the wireless communication device.

14. The autonomous travel system according to claim 13, each of the plurality of vehicles further including a load sensor for acquiring a load condition of a body and transmitting the load condition of the body acquired by the load sensor to the control station,
wherein the control station transmits the common offset information to the plurality of vehicles at a predetermined timing based on the load condition of the body received from one of the plurality of vehicles.

15. The autonomous travel system according to claim 14, wherein when the control station detects, based on the load condition of the body received from the one of the plurality of vehicles, a change in a body weight related to when dumping work completes, dumping work starts, loading work starts, or loading work completes in the one of the plurality of vehicles, the control station transmits the common offset information to the plurality of vehicles.

\* \* \* \* \*